(12) United States Patent
Sun

(10) Patent No.: US 11,250,090 B2
(45) Date of Patent: Feb. 15, 2022

(54) RECOMMENDED CONTENT DISPLAY METHOD, DEVICE, AND SYSTEM

(71) Applicant: TENCENT TECHNOLOGY (SHENZHEN) COMPANY LIMITED, Shenzhen (CN)

(72) Inventor: Xiaoyu Sun, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/851,347

(22) Filed: Apr. 17, 2020

(65) Prior Publication Data
US 2020/0242183 A1 Jul. 30, 2020

Related U.S. Application Data

(63) Continuation of application No. PCT/CN2018/111953, filed on Oct. 25, 2018.

(30) Foreign Application Priority Data

Nov. 15, 2017 (CN) .......................... 201711130175.4

(51) Int. Cl.
*G06F 40/30* (2020.01)
*G06F 16/9538* (2019.01)
(Continued)

(52) U.S. Cl.
CPC ...... *G06F 16/9538* (2019.01); *G06F 3/04842* (2013.01); *G06F 3/04845* (2013.01);
(Continued)

(58) Field of Classification Search
CPC ............ G06F 16/9538; G06F 16/9535; G06F 16/3334; G06F 40/30; G06F 40/169;
(Continued)

(56) References Cited

U.S. PATENT DOCUMENTS 5,619,410 A * 4/1997 Emori ................. G06F 16/3335
704/7
6,269,189 B1 * 7/2001 Chanod ............. G06F 16/90344
382/229
(Continued)

FOREIGN PATENT DOCUMENTS

| CN | 104239313 A | 12/2014 |
| CN | 106095848 A | 11/2016 |
| CN | 106503131 A | 3/2017 |

OTHER PUBLICATIONS

The World Intellectual Property Organization (WIPO) International Search Report for PCT/CN2018/111953 dated Jan. 30, 2019 5 Pages (including translation).

*Primary Examiner* — Nicholas Klicos
(74) *Attorney, Agent, or Firm* — Anova Law Group, PLLC

(57) ABSTRACT

A recommended content display method includes: receiving an operation signal directed to a target statement in a page displayed on a user interface of an application; determining an interested character sequence on the page according to the operation signal; and additionally displaying at least one group of recommended content on the user interface of the application. The interested character sequence includes the target statement and at least one of a preceding statement before the target statement or a following statement after the target statement. The recommended content is information content associated with the interested character sequence.

20 Claims, 17 Drawing Sheets

(51) Int. Cl.
*G06F 16/9535* (2019.01)
*G06F 3/0484* (2013.01)

(52) U.S. Cl.
CPC .......... *G06F 16/9535* (2019.01); *G06F 40/30* (2020.01); *G06F 2203/04803* (2013.01)

(58) Field of Classification Search
CPC .. G06F 40/216; G06F 40/284; G06F 3/04842; G06F 3/04845; G06F 3/0488; G06F 2203/04803
See application file for complete search history.

(56) References Cited

U.S. PATENT DOCUMENTS

| | | | | |
|---|---|---|---|---|
| 2003/0160830 A1* | 8/2003 | DeGross | ............... | G06F 40/242 |
| | | | | 715/808 |
| 2007/0112764 A1* | 5/2007 | Yih | ............... | G06F 40/169 |
| 2007/0288454 A1* | 12/2007 | Bolivar | ............... | G06Q 30/02 |
| 2011/0213655 A1* | 9/2011 | Henkin | ............... | G06Q 30/0251 |
| | | | | 705/14.49 |
| 2012/0291143 A1* | 11/2012 | Ajitomi | ............... | G06F 21/6218 |
| | | | | 726/30 |
| 2013/0132364 A1* | 5/2013 | Udupa | ............... | G06F 16/3334 |
| | | | | 707/709 |
| 2013/0253916 A1* | 9/2013 | Ikawa | ............... | G06F 16/345 |
| | | | | 704/9 |
| 2013/0254030 A1* | 9/2013 | Chou | ............... | G06F 16/9535 |
| | | | | 705/14.54 |
| 2014/0164401 A1* | 6/2014 | Kyaw | ............... | G06F 16/9535 |
| | | | | 707/751 |
| 2014/0195527 A1* | 7/2014 | Kim | ............... | G06F 16/951 |
| | | | | 707/723 |
| 2014/0304337 A1 | 10/2014 | Michaeli et al. | | |
| 2014/0337730 A1* | 11/2014 | King | ............... | G06F 3/0481 |
| | | | | 715/716 |
| 2015/0254349 A1* | 9/2015 | Sela | ............... | G06F 16/958 |
| | | | | 707/770 |
| 2016/0226804 A1* | 8/2016 | Hampson | ............... | H04L 51/18 |
| 2019/0155955 A1* | 5/2019 | Castaneda | ............... | G06F 16/3344 |
| 2019/0297042 A1* | 9/2019 | Prabhu | ............... | G06F 3/04817 |

\* cited by examiner

RECOMMENDED CONTENT DISPLAY METHOD, DEVICE, AND SYSTEM

CROSS-REFERENCES TO RELATED APPLICATIONS

This application is a continuation application of PCT Patent Application No. PCT/CN2018/111953, filed on Oct. 25, 2018, which claims priority to Chinese Patent Application 201711130175.4, filed on Nov. 15, 2017 and entitled "RECOMMENDED CONTENT DISPLAY METHOD, DEVICE, AND SYSTEM", the entire contents of both of which are incorporated herein by reference.

FIELD OF THE TECHNOLOGY

Embodiments of the present disclosure relate to the field of computers, and in particular, to a recommended content display method, device, and system.

BACKGROUND OF THE DISCLOSURE

A user is often interested in a noun on a page and further desires to obtain detailed information about the noun.

In the related art, in a case that an encyclopedia website displays an encyclopedia page of an entry A, a word corresponding to an entry B appears within contents of the page of entry A. In this case, the encyclopedia website displays the word corresponding to the entry B in a hyperlink form. If the user is interested in the word corresponding to the entry B, in a case that the user clicks the word, the encyclopedia website jumps from the encyclopedia page of the entry A to an encyclopedia page of the entry B. For example, in a case that the user views an encyclopedia page of an entry "top-ten classic movies", "this movie is directed by a director X" appears, and after clicking a hyperlink "the director X", the user enters an encyclopedia page of the director X.

However, the foregoing method is only applicable to mutual reference among pages in the encyclopedia website and cannot be applicable to most pages of non-encyclopedia network classes.

SUMMARY

Embodiments of the present disclosure provide a recommended content display method, device and system, so as to resolve the problem that the information display method in the related art can only be applied to encyclopedia websites and application scenarios are limited. The technical solutions are as follows:

According to one aspect of the present disclosure, a recommended content display method is provided, applied to a terminal. The method includes: receiving an operation signal directed to a target statement in a page displayed on a user interface of an application; determining an interested character sequence on the page according to the operation signal; and additionally displaying at least one group of recommended content on the user interface of the application. The interested character sequence includes the target statement and at least one of a preceding statement before the target statement or a following statement after the target statement. The recommended content is information content associated with the interested character sequence.

According to another aspect of the present disclosure, a terminal is provided. The terminal includes a processor and a memory. The processor is configured to receive an operation signal directed to a target statement in a page displayed on a user interface of an application; determine an interested character sequence on the page according to the operation signal; and additionally display at least one group of recommended content on the user interface of the application. The interested character sequence includes the target statement and at least one of a preceding statement before the target statement or a following statement after the target statement. The recommended content is information content associated with the interested character sequence.

According to another aspect of the present disclosure, a non-transitory computer-readable storage medium is provided. The storage medium stores at least one instruction, and the at least one instruction is loaded and executed by a processor to implement: receiving an operation signal directed to a target statement in a page displayed on a user interface of an application; and determining an interested character sequence on the page according to the operation signal; and additionally displaying at least one group of recommended content on the user interface of the application. The interested character sequence includes the target statement and at least one of a preceding statement before the target statement or a following statement after the target statement. The recommended content is information content associated with the interested character sequence.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

The embodiments of the present disclosure can provide an enhanced recommended content method. The method may be applied to the following application scenarios.

First, in a case that a webpage including a character sequence is displayed in a browser, if a user is interested in a certain segment of an interested character sequence, the browser provides other recommended content based on the interested character sequence to the user. The browser includes a browser kernel and a browser shell program.

For example, a webpage A is displayed in the browser. A character sequence is displayed on the webpage A. If the user is interested in a "festival A" in the character sequence, the browser may provide other recommended content based on the "festival A" to the user.

Second, in a case that a webpage including a character sequence is displayed in a non-browser application, if the user is interested in a certain segment of an interested character sequence, the application provides other recommended content based on the interested character sequence to the user. The non-browser application is an application internally provided with (or capable of invoking) a browser kernel.

For another example, a webpage B is displayed in the non-browser application. A character sequence is displayed on the webpage B. If the user is interested in a "star B" in the character sequence, the non-browser application may provide other recommended content based on the "star B" to the user.

Figure 1:
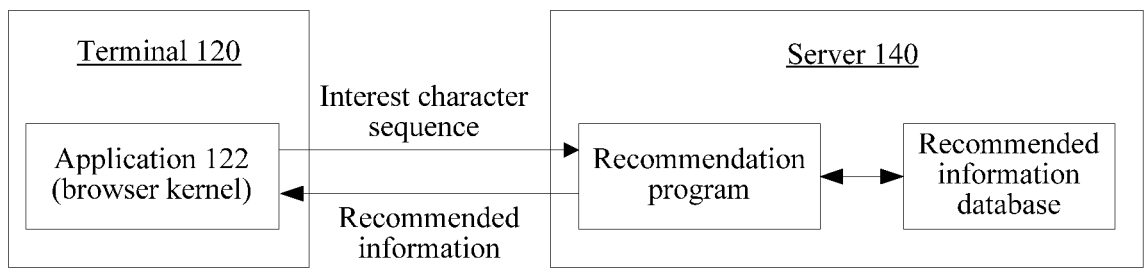
FIG. 1 is a system block diagram of a computer system according to an exemplary embodiment of the present disclosure.

FIG. 1 is a system block diagram of a computer system according to an exemplary embodiment of the present disclosure. The computer system includes a terminal 120 and a server 140.

The terminal 120 may be any one of a smartphone, a tablet computer, a notebook computer, and a desktop computer. An application (APP) 122 having a browser kernel is installed in the terminal 120. The application 122 may be a browser itself (internally provided with the browser kernel), or may be a non-browser application internally provided with the browser kernel. These non-browser applications may display a page in own pages by using the browser kernel. The terminal 120 may transmit an interested character sequence to the server 140 according to an operation signal of a user.

The terminal 120 may be connected to the server 140 by using a wired network or wireless network.

The server 140 is configured to provide an information recommendation service to the terminal 120. The server 140 may be one or more servers, or a data center. The server 140 may be a server set up by a provider of the browser kernel. Types of the recommended content include, but are not limited to: at least one of a topic circle, an application, navigation, a page, an audio, a video, a novel and encyclopedia. Optionally, all recommended content is information content associated with the interested character sequence.

After receiving the interested character sequence transmitted by the terminal 120, the server 140 determines at least one group of recommended content in a recommended information database according to the interested character sequence through a recommendation program, and feeds back the at least one group of recommended content to the terminal 120.

Figure 2:
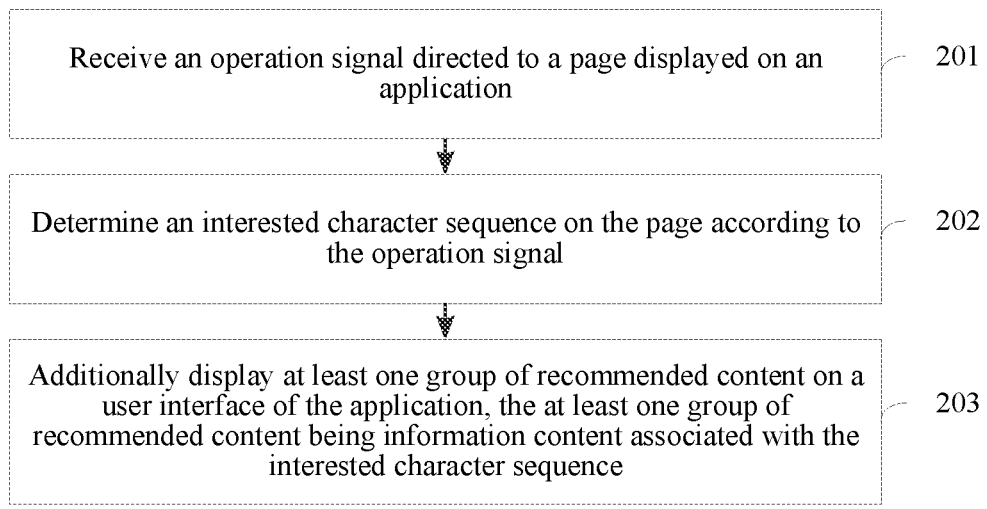
FIG. 2 is a flowchart of a recommended content display method according to an exemplary embodiment of the present disclosure.

FIG. 2 is a flowchart of a recommended content display method according to an exemplary embodiment of the present disclosure. In some embodiments, descriptions are provided by using an example in which the recommended content display method is applied to the terminal shown in FIG. 1. The method may be performed by the application in the terminal, or may be performed by the browser kernel in the application. The method includes the following operations:

Operation 201: Receive an operation signal directed to a page displayed on an application. For example, the operation signal may be directed to a target statement shown in the page. The page is displayed on a user interface of the application.

The application in the terminal may be a browser or another application having a browser kernel. The page may be a webpage loaded and opened by the browser, or may be a webpage loaded and opened by the application having the browser kernel, or may be further a non-webpage in the application.

At least a text is shown on the page.

The operation signal is a signal that a user triggers in a case of viewing the text on the page. The operation signal may be a single-click signal, a double-click signal, a long press signal, or a slide selection signal. Optionally, the application receives the operation signal.

Operation 202. Determine an interested character sequence on the page according to the operation signal.

The interested character sequence is a character sequence that the user may be interested in. The interested character sequence may be determined by the user's operation signal. The interested character sequence is a character sequence displayed on the page, or the interested character sequence is a subset of the character sequence displayed on the page.

Optionally, the application determines the interested character sequence on the page according to the operation signal.

Operation 203. Additionally display at least one group of recommended content on a user interface of the application, where the at least one group of recommended content is information content associated with the interested character sequence.

Optionally, the application additionally displays a group of recommended content on the user interface of the application.

The recommended content is the information related to the interested character sequence. Types of the recommended content include: at least one of a topic circle, an application, a page, navigation, an audio, a video, a novel and encyclopedia.

Optionally, the recommended content may be information content determined by the terminal according to a database stored in the terminal, or may be information content that the terminal obtains from a server.

Optionally, the recommended content is information related to a keyword in the interested character sequence. The recommended content includes: at least one of a topic circle, an application, a page, navigation, an audio, a video, a novel and encyclopedia related to the keyword.

Based on the foregoing, according to the recommended content display method provided in some embodiments, in a case that the page is displayed on the application, the interested character sequence is determined on the page according to the operation signal, and the at least one group of recommended content is additionally displayed on the user interface of the application, where the recommended content is the information content related to the interested character sequence. Therefore, a webpage or a website not required to be specifically improved can also provide the recommended content in which the user is interested for the interested character sequence on the page, which can be applied to an overwhelming majority of page display scenes, and the recommended content can be obtained by the user only in need of few operation signals, thereby reducing cumbersome operations in a case that the user obtains the recommended content by adopting a conventional search mode, and improving the information obtaining efficiency in a case that the user obtains the recommended content.

Figure 3:
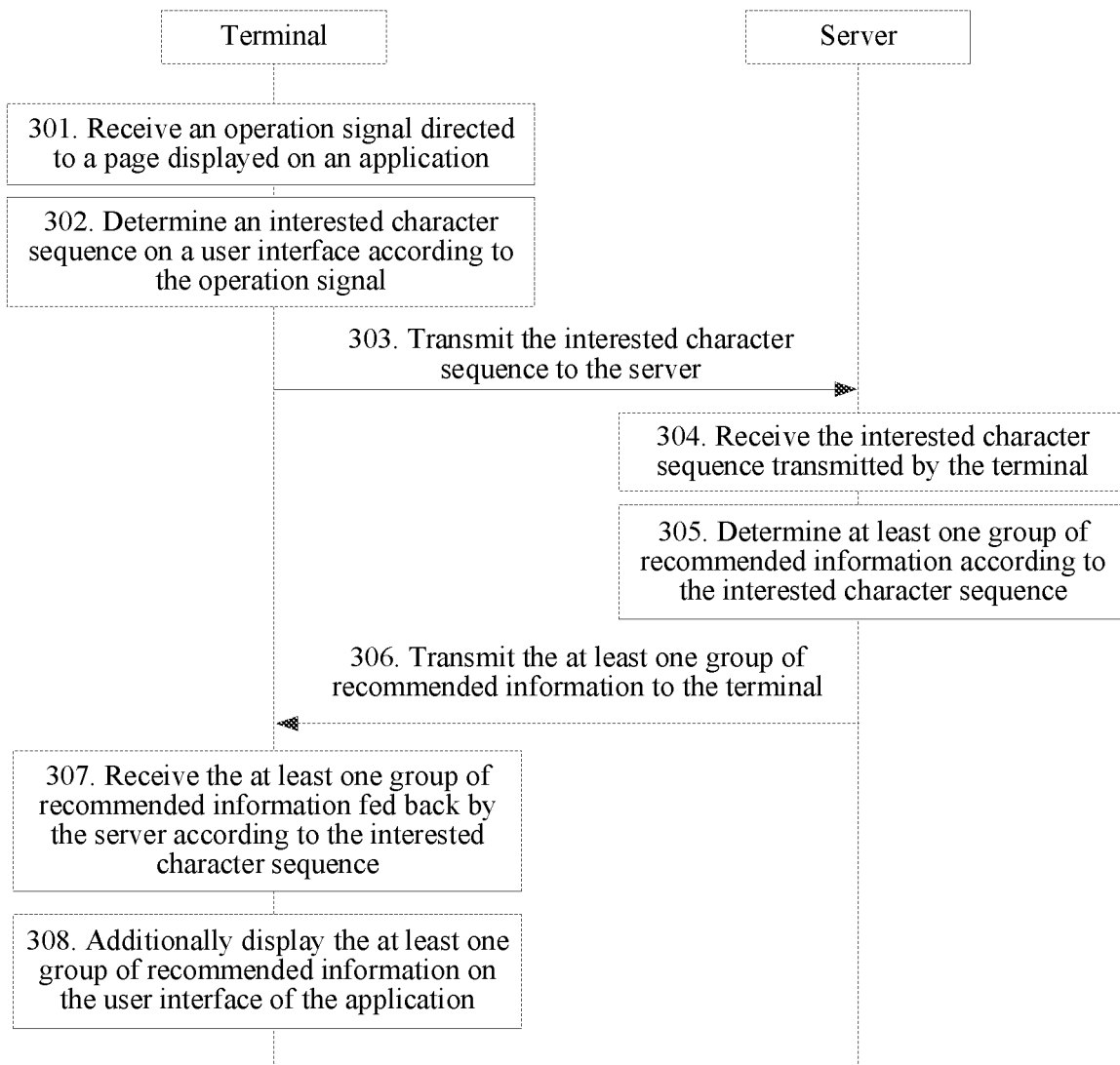
FIG. 3 is a flowchart of a recommended content display method according to another exemplary embodiment of the present disclosure.

FIG. 3 is a flowchart of a recommended content display method according to another exemplary embodiment of the present disclosure. In some embodiments, descriptions are provided by using an example in which the recommended content display method is applied to the computer system shown in FIG. 1. The operations corresponding to a terminal side in the method may be performed by the application in the terminal, or may be performed by the browser kernel in the application. The method includes the following operations:

Operation 301: A terminal receives an operation signal directed to a page displayed on an application.

The application in the terminal may be a browser or another application having a browser kernel. The page may be a webpage loaded and opened by the browser, or may be a webpage loaded and opened by the application having the browser kernel, or may be further a non-webpage opened by the application.

At least a text is shown on the page.

The operation signal is a signal that a user triggers in a case of viewing the text on the page. The operation signal may be a single-click signal, a double-click signal, a long press signal, or a slide selection signal.

Optionally, the application receives the operation signal through the browser kernel.

Operation 302. The terminal determines an interested character sequence on the page according to the operation signal.

The interested character sequence is a character sequence that the user may be interested in. The interested character sequence may be determined by the user's operation signal.

The interested character sequence may include a word, or may include one or more statements. This is not limited in the present disclosure. The interested character sequence is a character sequence displayed on the page, or the interested character sequence is a subset of the character sequence displayed on the page.

Optionally, the application determines the interested character sequence on the page through the browser kernel according to the operation signal.

Operation 303. The terminal transmits the interested character sequence to a server.

Optionally, the application transmits the interested character sequence to the server through the browser kernel.

Operation 304. The server receives the interested character sequence transmitted by the terminal.

Operation 305. The server determines at least one group of recommended content according to the interested character sequence.

The recommended content is information related to the interested character sequence. Types of the recommended content include: at least one of a topic circle, an application, a page, navigation, an audio, a video, a novel and encyclopedia.

Optionally, the recommended content is information related to a keyword in the interested character sequence. The recommended content includes: at least one of a topic circle, an application, a page, navigation, an audio, a video, a novel and encyclopedia related to the keyword.

Operation 306. The server transmits the at least one group of recommended content to the terminal.

Optionally, each group of recommended content is a combination of at least one element of a text, a picture, a website, an audio, and a video surrounding a recommended topic.

For example, the interested character sequence is a name of a character. The recommended topic may be a biographical-introduction of the character, published literary works of the character, film and television works of the character, songs sung by the character, or the like. For the biographical-introduction of the character, a group of recommended content may be formed through elements such as a head portrait of the character, a text introduction, and an encyclopedia website.

Operation 307. The terminal receives the at least one group of recommended content fed back by the server according to the interested character sequence.

The application receives, through the browser kernel, the at least one group of recommended content fed back by the server.

Operation 308. The terminal additionally displays the at least one group of recommended content on a user interface of the application.

The application additionally displays the at least one group of recommended content on the user interface of the application through the browser kernel.

A manner of "additionally displaying" includes, but is not limited to the following two cases.

1. A current level of the user interface of the application is kept unchanged, the at least one group of recommended content is overlay-displayed on an upper layer of a predetermined area of the user interface of the application, and a display level of the recommended content is higher than a display level of an original user interface.

Figure 4:
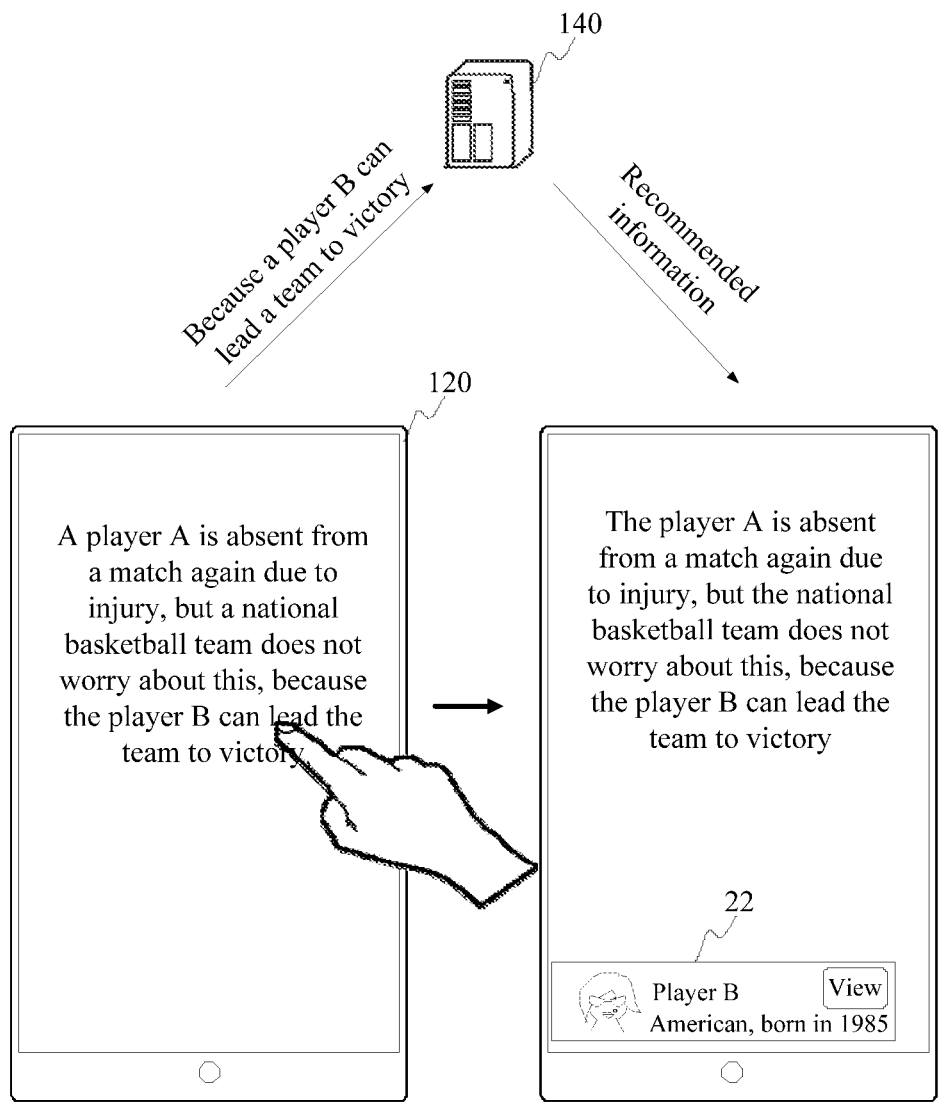
FIG. 4 is a schematic interface diagram of an implementation of the recommended content display method according to the embodiment of FIG. 3.

With reference to FIG. 4, a webpage is displayed on an application of a terminal 120. The webpage displays a text "a player A is absent from a match again due to injury, but a national basketball team does not worry about this, because a player B can lead the team to victory". When a user clicks "player B" on the webpage, the terminal 120 may transmit an interested character sequence "because the player B can lead the team to victory" to a server 140 according to the click operation. The server 140 queries at least one group of recommended content according to the interested character sequence "because the player B can lead the team to victory", and then transmits the recommended content to the terminal 120. The terminal 120 overlays (also called overlay-displays) the recommended content 22 on the upper layer of the user interface of the application. The recommended content 22 may be a character introduction page of the player B.

2. The displayed content of the predetermined area of the user interface of the application is changed, and the changed displayed content is the at least one group of recommended content. The display level of the recommended content is the same as the display level of the original user interface.

Figure 5:
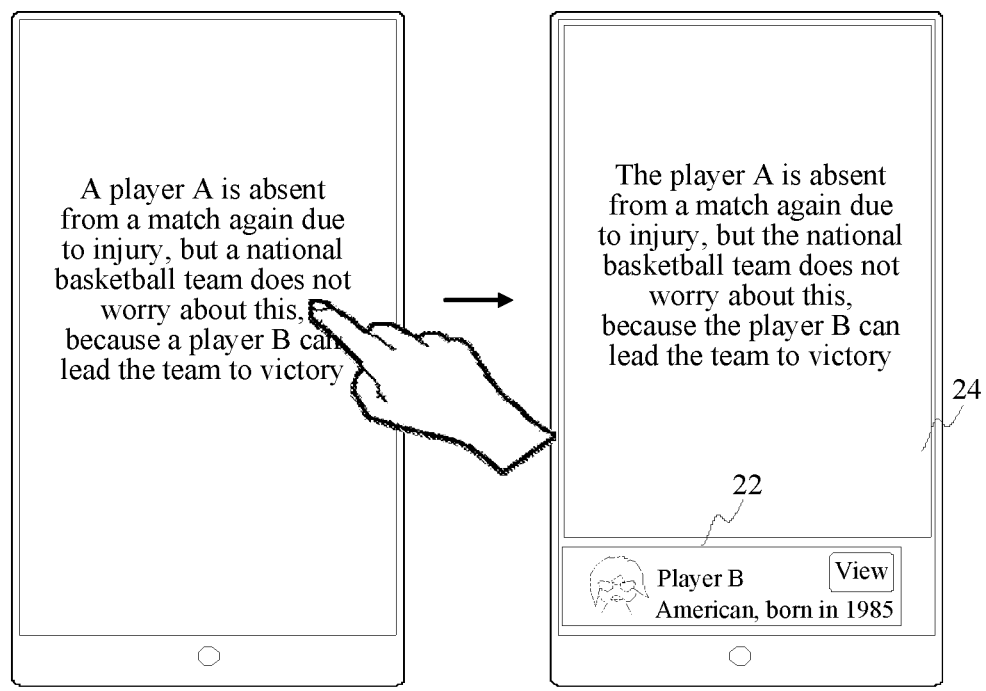
FIG. 5 is a schematic interface diagram of another implementation of the recommended content display method according to the embodiment of FIG. 3.

With reference to FIG. 5, the terminal 120 changes displayed content of a bottom area of the user interface of the application, where the changed displayed content is the recommended content 22. In addition, the changed displayed content and the user interface are at the same display level.

Based on the foregoing, according to the recommended content display method provided in some embodiments, in a case that the page is displayed on the application, the interested character sequence is determined on the page according to the operation signal, and the at least one group of recommended content is additionally displayed on the user interface of the application, where the recommended content is the information content related to the interested character sequence. Therefore, a webpage or a website not required to be specifically improved can also provide the recommended content in which a user is interested for the interested character sequence on the page, which can be applied to an overwhelming majority of page display scenes, and the recommended content can be obtained by the user only in need of few operation signals, thereby reducing cumbersome operations in a case that the user obtains the recommended content by adopting a conventional search mode, and improving the information obtaining efficiency in a case that the user obtains the recommended content.

The server queries and feeds back the recommended content. On one hand, the calculation amount of the terminal can be reduced. On the other hand, the timeliness and richness of the recommended content can be enhanced.

The operations performed by the terminal in the foregoing embodiments may be implemented to become the recommended content display method for the terminal side, and the operations performed by the server in the foregoing embodiments may be implemented to become a recommended content transmission method for the server side.

FIG. 4 is a flowchart of a recommended content display method according to another embodiment of the present disclosure. In some embodiments, descriptions are provided by using an example in which the recommended content display method is applied to the computer system shown in FIG. 1. The method includes the following operations:

Operation 401: A terminal receives an operation signal directed to a page displayed on an application.

The application in the terminal may be a browser or another application having a browser kernel. The page may be a page loaded and opened by the browser, or may be a page loaded and opened by the application having the browser kernel.

The page displays at least a text, and may also display other content such as a picture, an audio, a video, and an animation. The operation signal is a signal that a user triggers in a case of viewing the text on the page. The operation signal may be a single-click signal, a double-click signal, a long press signal, or a slide selection signal. In some embodiments, descriptions are provided by using an example in which the operation signal is the click signal.

Optionally, the browser kernel receives the operation signal.

Exemplarily, referring to FIG. 5, the page displays a text "In a latest mobile phone launch event, Fruit launched a new smartphone, and the fruit 8 mobile phone has performance better than a previous generation by 50%". A user may click the text.

Operation 402. The terminal determines, on the page, a target statement in which the operation signal is located.

The operation signal is a signal of operating a character or a word in a statement on a page. The browser kernel may determine the target statement in which the operation signal is located.

Optionally, the browser kernel determines, on the page, the target statement in which the operation signal is located.

An example in which the operation signal is the click signal is used. The browser kernel in the terminal determines, on the page, the target statement in which the click signal is located. Optionally, the browser kernel stores layout information of the page, and queries the corresponding target statement in the layout information according to trigger coordinates of the click signal.

Exemplarily, referring to FIG. 5, the browser kernel determines "Fruit launched a new fruit 8 mobile phone" as a target statement according to an operation position.

Operation 403. The terminal determines the target statement, a preceding statement before the target statement and a following statement after the target statement as the interested character sequence. In some embodiments, the interested character sequence may include the target statement and at least one of the preceding statement or the following statement.

The preceding statement is a statement before the target statement, and there may be one or more preceding statements. The following statement is a statement after the target statement, and there may be one or more following statements. The preceding statement and the following statement are used for understanding context information of the target statement.

When the target statement is an $i^{th}$ statement, the preceding statement before the $i^{th}$ statement is an $(i-1)^{th}$ statement, and the following statement after the $i^{th}$ statement is an $(i+1)^{th}$ statement.

When the target statement is a first statement, the preceding statement may be empty. When the target statement is a last statement, the following statement may be empty.

The browser kernel determines the target statement, the preceding statement before the target statement and the following statement after the target statement as the interested character sequence.

Exemplarily, referring to FIG. 5, the browser kernel determines "In a latest mobile phone launch event" as the preceding statement, and "The fruit 8 mobile phone has performance better than a previous generation by 50%" as the following statement.

Operation 404. The terminal transmits an interested character sequence to a server.

The application in the terminal transmits the interested character sequence to the server. Optionally, the application transmits the interested character sequence to the server through the browser kernel.

Operation 405. The server receives the interested character sequence transmitted by the terminal.

The server receives the interested character sequence transmitted by the application in the terminal. The interested character sequence includes the target statement, the preceding statement before the target statement and the following statement after the target statement.

For example, the interested character sequence includes "In a latest mobile phone launch event, Fruit launched a new smartphone, and the fruit 8 mobile phone has performance better than a previous generation by 50%".

Operation 406. The server performs semantic analysis on the preceding statement, the target statement and the following statement to obtain at least one word segment of the target statement according to a semantic analysis result.

After the server performs the semantic analysis on the target statement by virtue of the context information of the target statement, the at least one word segment of the target statement is obtained according to the semantic analysis result. The context information of the target statement is obtained according to the preceding statement and/or the following statement.

Optionally, a neural network model based on the semantic analysis is preset in the server, and the neural network model is configured to perform word segmentation on the target statement. The server inputs the preceding statement, the target statement and the following statement into the preset neural network model to obtain the at least one word segment of the target statement, where the at least one word segment is all or some of word segments forming the target statement. In some embodiments, the preset neural network model also outputs a corresponding weight for each word segment of the target statement, where the weight represents the importance of the word segment in the target statement.

For example, the server inputs an interested character sequence into the preset neural network model, and determines, according to context semantics of the preceding statement and the following statement, that the segmentation result of the target statement is "Fruit_launched_a_new_fruit_8_mobile_phone", and corresponding weights of words are "0.2_0.1_0.01_0.09_0.5_0.1".

Operation 407. The server extracts a keyword from the at least one word segment of the target statement.

The server extracts a keyword from each word segment of the target statement according to a preset policy. There is generally one keyword, or there may be a plurality of keywords. This is not limited in the present disclosure.

Optionally, in a case that the preset neural network model outputs the corresponding weight for each word segment, the server extracts the word segment having a maximum weight as the keyword. For example, a word segment "fruit 8" having the highest weight of 0.5 is determined as the keyword.

Optionally, the server may alternatively extract a keyword from each word segment of the target statement according to a part-of-speech priority. For example, the server extracts a word belonging to noun part-of-speech from each word segment of the target statement as the keyword. Alternatively, the server extracts a keyword from each word segment of the target statement according to semantics. For example, the server extracts a subject or an object of the target statement as the keyword.

The manner of extracting a keyword by the server is not limited in the present disclosure provided that a search intention of the user can be accurately understood, and an accurate keyword can be further extracted. Even the server can determine, according to the interested character sequence, a word that does not exist originally in the target statement but can represent the target statement as the keyword.

Operation 408. The server queries at least one group of recommended content corresponding to the keyword.

The server further stores a recommendation program and a recommended content database, where the recommendation program may be a program of an object-based collaborative filtering algorithm, or may be a neural network program.

After the server inputs the keyword into the recommendation program, the recommendation program may query the at least one group of recommended content associated with the keyword from the recommended content database.

Types of the recommended content include: at least one of a topic circle, a character introduction, an institution or an enterprise, a commodity, an application, a page, navigation, an audio, a video, a novel and encyclopedia related to the keyword.

Each group of recommended content is a combination of at least one element of a text, a picture, a website, an audio, and a video surrounding a recommended topic.

Operation 409. The server transmits the at least one group of recommended content to the terminal.

The server may transmit the at least one group of recommended content to the application in the terminal.

For example, the server transmits a plurality of groups of recommended content related to the keyword "fruit 8" to the terminal, and the groups of recommended content respectively relate to an introduction, an official website, a purchase entry, promotional information, an evaluation video, and the like of the "fruit 8" mobile phone.

Operation 410. The terminal receives the at least one group of recommended content fed back by the server according to the interested character sequence.

The browser kernel receives the at least one group of recommended content fed back by the server according to the interested character sequence.

Operation 411. The terminal additionally displays at least one card view in an assigned area on a user interface of the application, each card view being used for displaying one group of recommended content. The assigned area may be any local partial area on the user interface, such as a side area. The assigned area may be predetermined by the application or may be adjusted in the settings of the application. Hereinafter, the assigned area may also be referred as side area.

Optionally, the application in the terminal overlay-displays at least one group of card views in the side area on the user interface in a predetermined direction in a sequential arrangement mode, each card view being used for displaying the one group of recommended content.

"Overlay-displaying" refers to keeping a current level of the user interface of the application unchanged, and overlay-displaying the at least one group of recommended content on an upper layer of a predetermined area of the user interface of the application. A display level of the recommended content is higher than a display level of an original user interface.

The side area is a side area located on a top side, a bottom side, a left side or a right side of the user interface. Optionally, in a case that the terminal is vertically disposed, the side area is the top side area or the bottom side area. When the terminal is transversely disposed, the side area is the left side area or the right side area. A position of the side area is set on a principle that normal viewing of the page by the user is not affected as much as possible.

Optionally, the card view is displayed on the side area on the user interface in suspension form. When the terminal is vertically disposed, more than two card views are disposed in a suspension mode in a horizontal direction in a sequential arrangement mode. When the terminal is transversely disposed, more than two card views are disposed in a suspension mode in a vertical direction in a sequential arrangement mode. Adjacent card views are next to each other, or there is a spacing having a predetermined width between the adjacent card views.

Each card view is used for displaying one group of recommended content. Because the one group of recommended content may include at least one of a text, an image, a page, an audio, and a video, each card view may include one or more controls, and a type of each control is any one of a text control, an image control, a button control, an audio playback control, a video playback control and a document processing control. A plurality of different types of controls are integrated on the same card view, so that the card view can display different information in the one group of recommended content separately.

Exemplarily, referring to FIG. 5, a card view 51 and a card view 52 corresponding to the "fruit 8" are overlay-displayed on the bottom side area of the application. The card view 51 is configured to display an official webpage of the "fruit 8" mobile phone. The card view 52 is configured to display the purchase entry of the "fruit 8" mobile phone. The card view 51 includes the image control, the text control and the button control, where the image control is configured to display a thumbnail of the fruit 8 mobile phone, the text control is configured to display a text "fruit 8 (official website), a flagship mobile phone launched by the Fruit company", and the button control is configured to display a quick entry for viewing the page.

Optionally, each card view is rectangular or rounded rectangular. A width of each card view is less than a width of the side area, and a length of each card view is less than a length of the side area. Different card views may have the same length and width, or may have the same width and different lengths.

Because an area of the side area is limited, and all of the recommended content probably cannot be fully displayed, each card view located in the side area can be slidably displayed.

Operation 412. The terminal receives a slide signal in the side area.

When the more than two card views are disposed in a horizontal direction, the slide signal may be a leftward slide signal or a rightward slide signal. When the more than two card views are disposed in a vertical direction, the slide signal may be an upward slide signal or a downward slide signal.

Operation 413. The terminal moves a first card view located on a first side of the side area out of the side area along with the slide signal, and moves a second card view from a second side of the side area into the side area for display.

When the more than two card views are arranged in a horizontal direction, the slide display mode may be as follows:

The terminal receives the leftward slide signal in the side area, moves the first card view located on a left side of the side area out of the side area along with the leftward slide signal, and moves the second card view from a right side of the side area into the side area for display. Alternatively, the terminal receives the rightward slide signal in the side area, moves a third card view located on the right side of the side area out of the side area along with the rightward slide signal, and moves a fourth card view from the left side of the side area into the side area for display.

Figure 6:
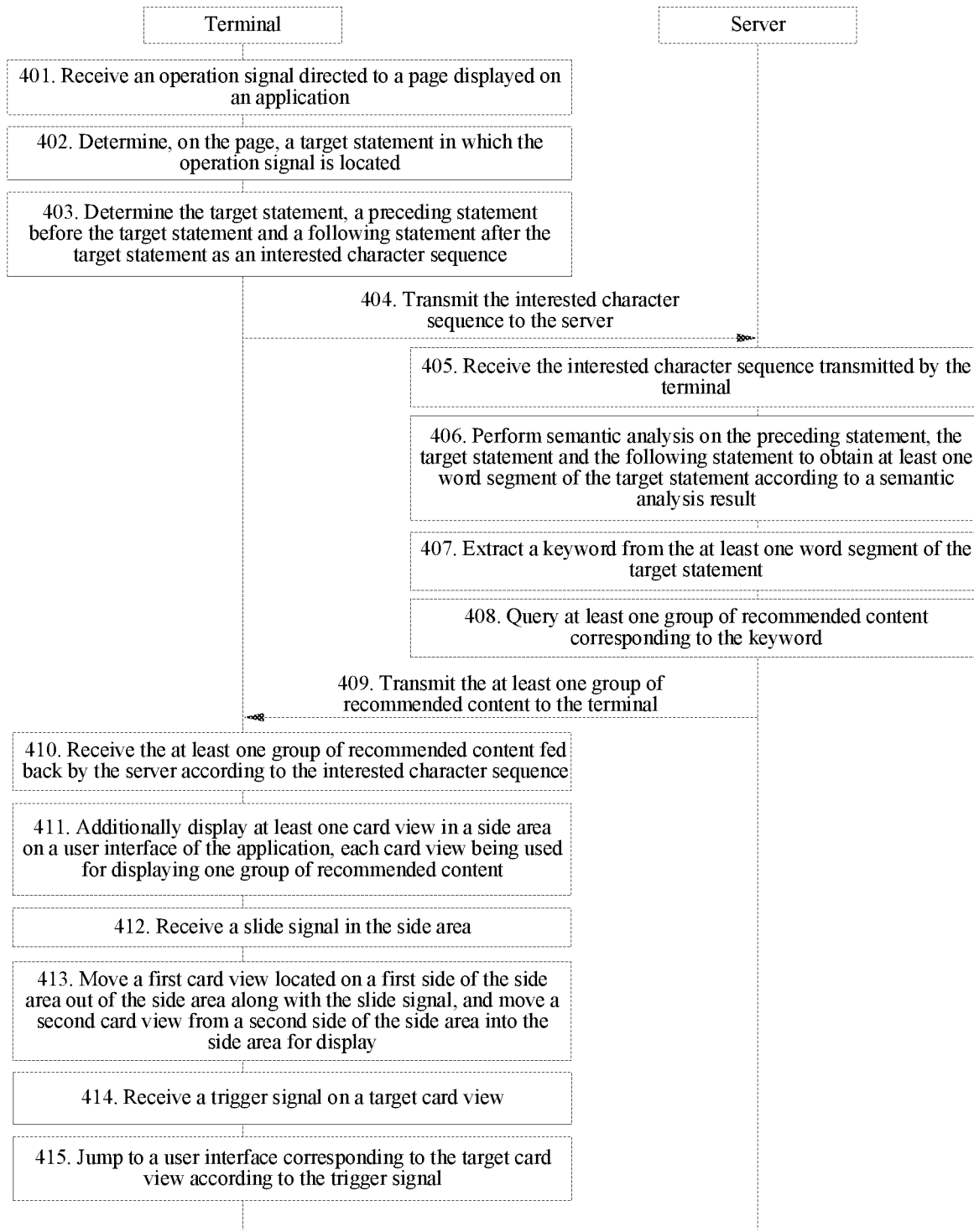
FIG. 6 is a flowchart of a recommended content display method according to an exemplary embodiment of the present disclosure.

Exemplarily, referring to FIG. 6, in a case that receiving the leftward slide signal, the browser kernel moves the card view 51 located on the left side of the side area out of the side area along with the leftward slide signal, and moves a card view 53 located on the right side of the side area into the side area (not originally displayed in the terminal) for display. The card view 52 between the card view 51 and the card view 53 is slidably displayed along with the leftward slide signal.

Figure 7:
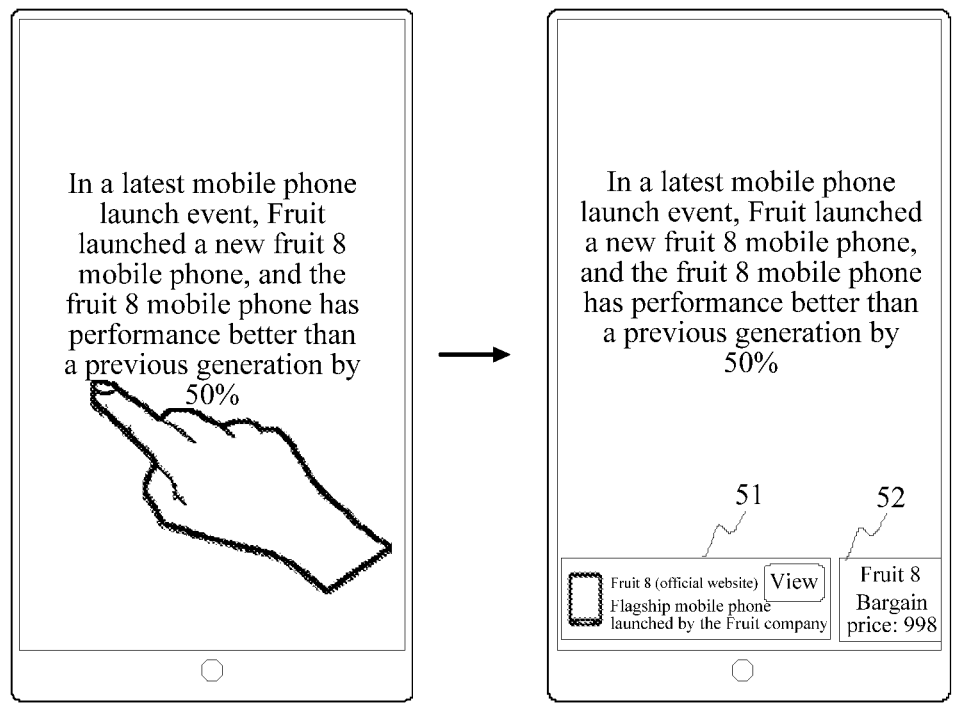
FIG. 7 to FIG. 13 are schematic interface diagrams of a recommended content display method during implementation according to some exemplary embodiments of the present disclosure.

Exemplarily, referring to FIG. 7, in a case that receiving the rightward slide signal, the browser kernel moves the card view 53 located on the right side of the side area out of the side area along with the rightward slide signal, and moves the card view 51 located on the left side of the side area into the side area (not originally displayed in the terminal) for display. The card view 52 between the card view 51 and the card view 53 is slidably displayed along with the rightward slide signal.

In some embodiments, in a case that the more than two card views are arranged in a vertical direction, the slide display mode may be as follows:

The terminal receives the upward slide signal in the side area, moves a fifth card view located on an upper side of the side area out of the side area along with the upward slide signal, and moves a sixth card view from a lower side of the side area into the side area for display. Alternatively, the terminal receives the downward slide signal in the side area, moves a seventh card view located on the lower side of the side area out of the side area along with the downward slide signal, and moves an eighth card view from the upper side of the side area into the side area for display.

Operation 414. The terminal receives a trigger signal on a target card view.

Because the area of each card view is limited, the recommended content that can be displayed is also limited. When intending to view more detailed content of the group of recommended content, a user may click the target card view corresponding to the group of recommended content.

The application in the terminal receives the trigger signal on the target card view, where the trigger signal may be a trigger signal for clicking any position on the target card view, or may be a trigger signal for clicking a target control on the target card view. The target control may be at least one of a button control, an audio playback control, a video playback control, and a document processing control.

Operation 415. The terminal jumps to a user interface corresponding to the target card view according to the trigger signal.

The application in the terminal jumps to the user interface corresponding to the target card view according to the trigger signal. The user interface may be a page, or may be a user interface of another application.

Figure 8:
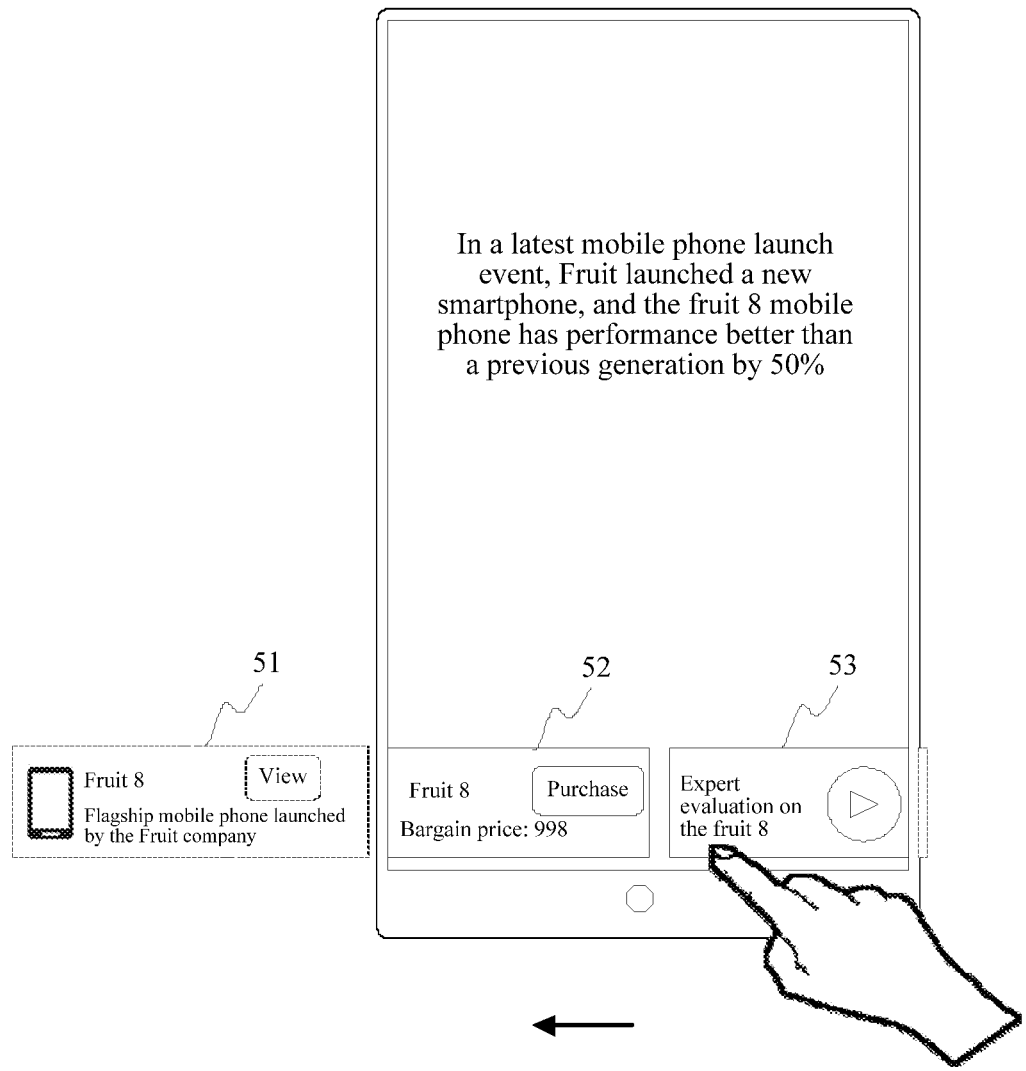

Optionally, in a case that the recommended information corresponding to the target card view includes an introduction information page, the application in the terminal jumps to the introduction information page according to the trigger signal, where the introduction information page may be used for introducing a character, a place, a commodity, an institution and the like, as shown in FIG. 8.

Figure 9:
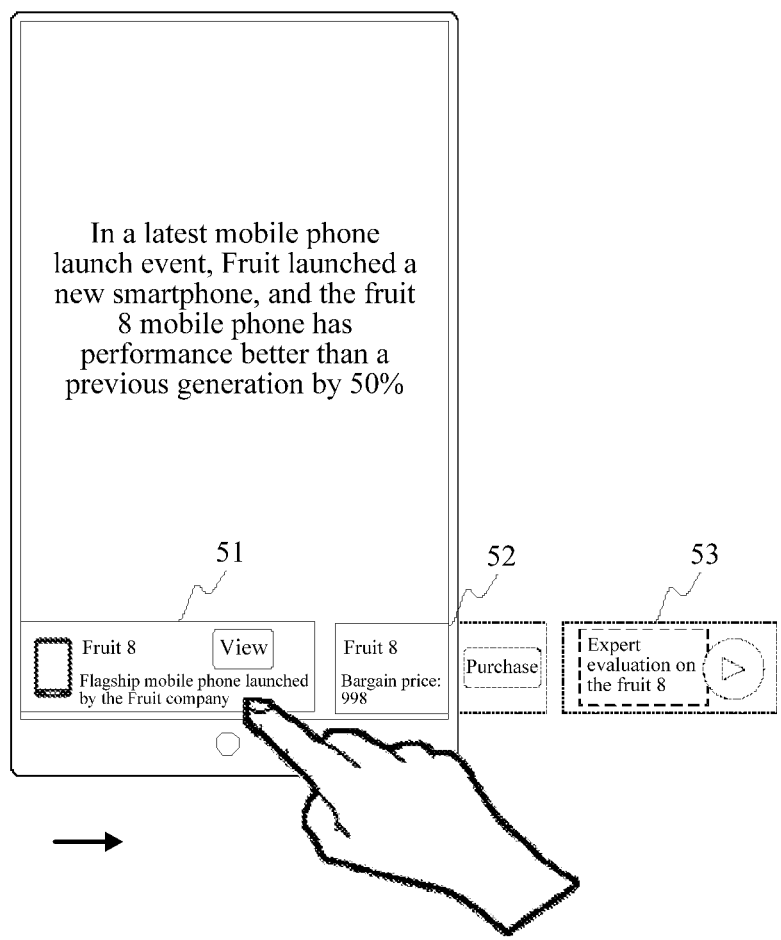

Optionally, in a case that the recommended information corresponding to the target card view includes a geographical location, the application in the terminal invokes a navigation program according to the trigger signal, and the navigation program displays map information or navigation information of the geographical location, as shown in FIG. 9. Definitely, if the application itself also has the navigation capability, the application may invoke its own navigation component to display the map information or the navigation information of the geographical location.

Figure 10:
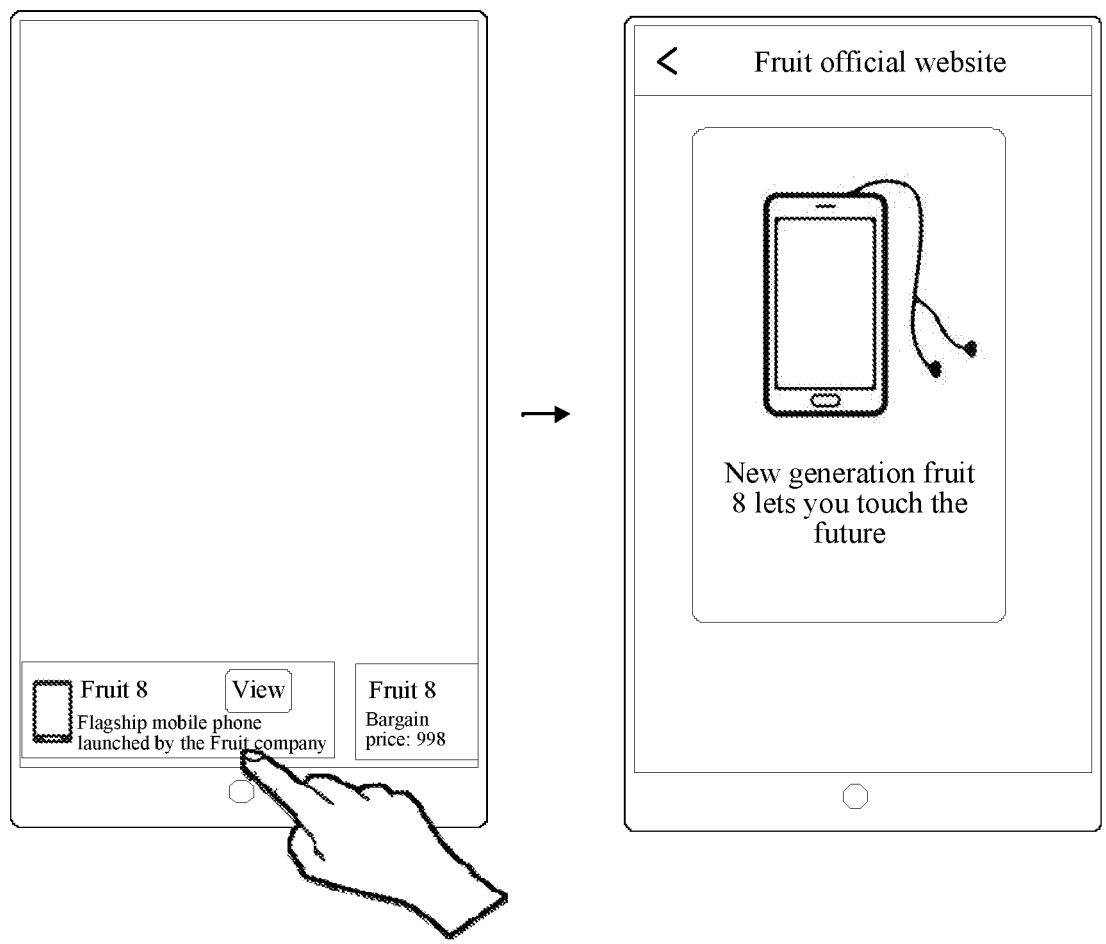

Optionally, in a case that the recommended information corresponding to the target card view includes an audio or a video, the browser kernel invokes the audio playback control or the video playback control according to the trigger signal to play the audio or the video, as shown in FIG. 10. Definitely, if the application itself also has the multimedia playback capability, the application may invoke its own audio playback component to play the audio, or invoke its own video playback component to play the video.

Figure 11:
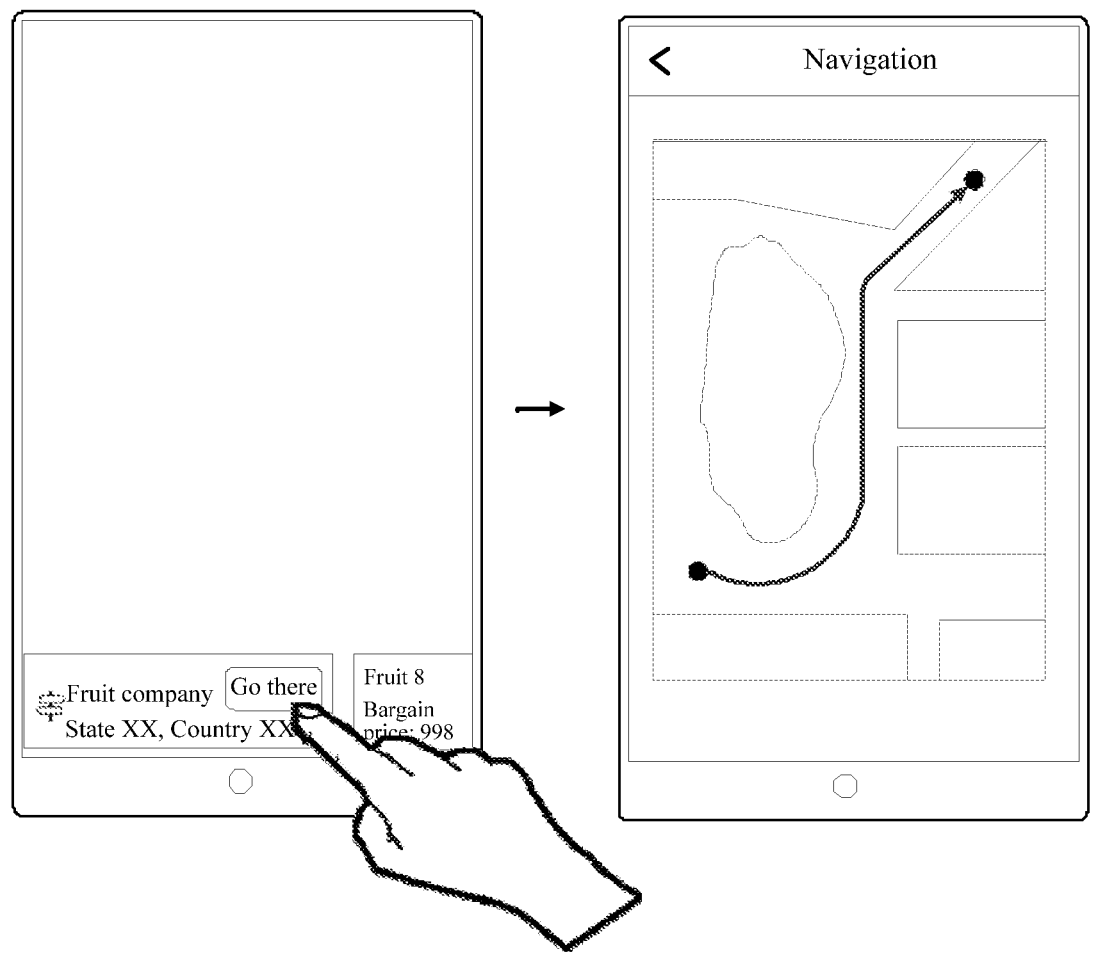

Optionally, in a case that the recommended information corresponding to the target card view includes a document, the browser kernel invokes a document processing program according to the trigger signal, and the document processing program opens and processes the document, as shown in FIG. 11. Definitely, if the application itself also has the document processing capability, the application may invoke its own document processing control to open and process the document.

Based on the foregoing, according to the recommended content display method provided in some embodiments, in a case that the page is displayed on the application, the interested character sequence is determined on the page according to the operation signal, and the at least one group of recommended content is additionally displayed on the user interface of the application, where the recommended content is the information content related to the interested character sequence. Therefore, a webpage or a website not required to be specifically improved can also provide the recommended content in which the user is interested for the interested character sequence on the page, which can be applied to an overwhelming majority of page display scenes, and the recommended content can be obtained by the user only in need of few operation signals, thereby reducing cumbersome operations in a case that the user obtains the recommended content by adopting a conventional search mode, and improving the information obtaining efficiency in a case that the user obtains the recommended content.

According to the recommended content display method provided in some embodiments, after the user triggers the click signal, the server analyzes the context information of the target statement based on the semantic analysis, and accurately identifies the keyword conforming to the intention of the user (for example, a "fruit 8" mobile phone is not mistakenly understood as "fruit"), so that the recommended content is accurately transmitted to the user. The recommended content may be obtained only in need of a simple click action of the user, thereby greatly improving the information obtaining efficiency in a case that the user obtains the recommended content.

According to the recommended content display method provided in some embodiments, different card views may be switched back and forth through a slide operation to provide a selection mode for the user to quickly select between different recommended information. A plurality of card views are displayed in an intuitive and concise manner, and no excessive display area of the whole user interface is occupied. Because current terminals evolve to a full-screen 18:9 aspect ratio, and a screen of each terminal is relatively slender, adoption of the display mode does not influence reading of the page by the user, and an idle display space of the top area or the bottom area of the terminal can be fully utilized, thereby achieving quite high display efficiency.

According to the recommended content display method provided in some embodiments, after the user triggers the target card view, the terminal may further jump to the user interface corresponding to the target card view, so that the user can obtain detailed information of the recommended content in a display space with a larger area, thereby simplifying the man-machine interaction process.

The operations performed by the terminal in the foregoing embodiments may be implemented to become the recommended content display method for the terminal side, and the operations performed by the server in the foregoing embodiments may be implemented to become a recommended content transmission method for the server side.

Figure 12:
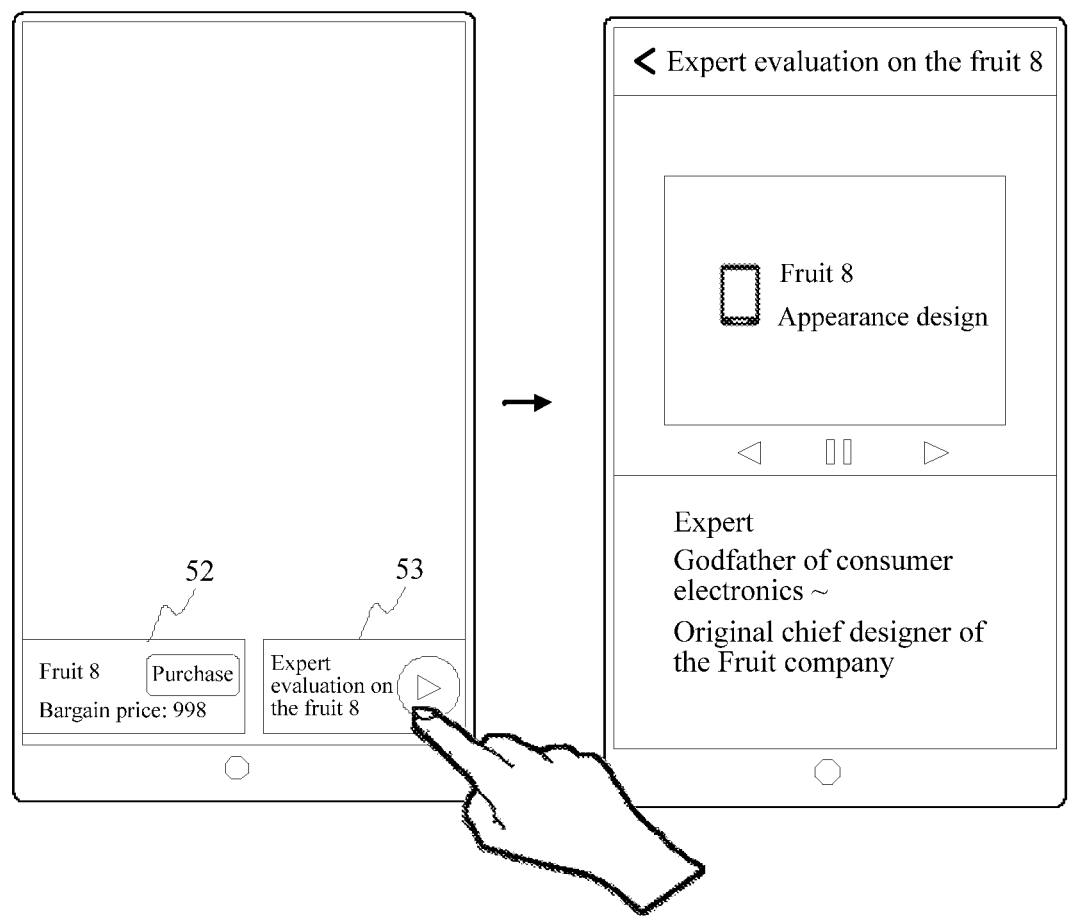

In an optional embodiment based on the embodiment of FIG. 4, operation 404 to operation 407 relating to keyword selection in the embodiment of FIG. 4 may alternatively be implemented as following operations, as shown in FIG. 12.

Operation 404a. The terminal transmits the interested character sequence and an operation position to the server, where the operation position is an operation position, in the target statement, of a click signal received by the terminal.

The operation position may be represented by a word that is clicked, or may be represented by two words that are respectively located on both sides of the operation position.

Optionally, the application transmits the interested character sequence and the operation position to the server through the browser kernel.

Operation 405a. The server receives the interested character sequence and the operation position transmitted by the terminal.

The server receives the interested character sequence transmitted by the browser kernel. The interested character sequence includes the target statement, a preceding statement before the target statement and a following statement after the target statement. The operation position is an operation position, in the target statement, of a click signal received by the terminal.

Operation 406a. The server performs semantic analysis on the preceding statement, the target statement and the following statement to obtain at least one word segment of the target statement according to a semantic analysis result.

After the server performs the semantic analysis on the target statement by virtue of context information of the target statement, the at least one word segment of the target statement is obtained according to the semantic analysis result. The context information of the target statement is obtained according to the preceding statement and/or the following statement.

Optionally, a neural network model based on the semantic analysis is preset in the server, and the neural network model is configured to perform word segmentation on the target statement. The server inputs the preceding statement, the target statement and the following statement into the preset neural network model to obtain the at least one word segment of the target statement, where the at least one word segment is all or some of the word segments forming the target statement.

Operation 407a. The server extracts a word segment closest to the operation position from the at least one word segment of the target statement as the keyword.

A word segment closer to the operation position indicates a higher probability of conforming to the user's search intention. Therefore, the server extracts the word segment closest to the operation position from the at least one word segment of the target statement as the keyword.

Based on the foregoing, according to the recommended content display method provided in some embodiments, the terminal further transmits the operation position of the click signal in the target statement to the server, so that the server can determine a more accurate keyword with reference to the operation position, thereby improving the accuracy of the recommended content transmitted to the user, and enabling the recommended content to better conform to an actual search intention of the user.

Figure 13:
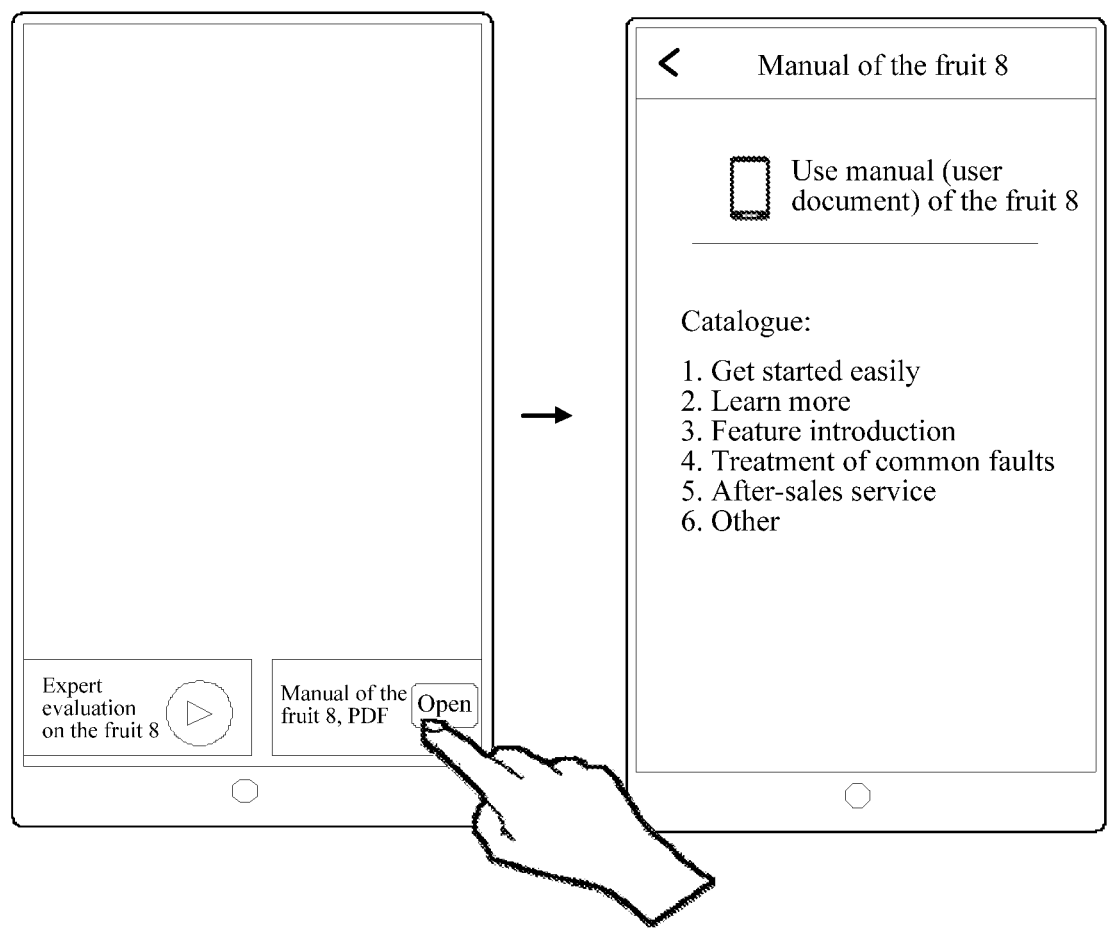

FIG. 13 is a flowchart of a recommended content display method according to another exemplary embodiment of the present disclosure. In some embodiments, descriptions are provided by using an example in which the recommended content display method is applied to the computer system shown in FIG. 1. The operations corresponding to a terminal side in the method may be performed by the application in the terminal, or may be performed by the browser kernel in the application. The method includes the following operations:

Operation 701: A terminal receives an operation signal directed to a page displayed on an application.

The application in the terminal may be a browser or another application having a browser kernel. The page may be a page loaded and opened by the browser, or may be a page loaded and opened by the application having the browser kernel.

At least a text is shown on the page.

The operation signal is a signal that a user triggers in a case of viewing the text on the page. The operation signal may be a single-click signal, a double-click signal, a long press signal, or a slide selection signal. Optionally, the browser kernel receives the operation signal.

Operation 702. Determine, on the page, a keyword selected by the operation signal.

An example in which the operation signal is a slide selection signal is used. The browser kernel determines a word passing through a slide path of the slide selection signal as a keyword.

Optionally, the browser kernel determines, on the page, the target statement in which the operation signal is located.

Optionally, in a case that the browser kernel receives the long press signal, a text selection control is displayed according to the long press signal, where the text selection control includes a starting point selection cursor and an end point selection cursor. When the browser kernel receives the slide selection signal acting on the starting point selection cursor, a text serving as a starting point is selected according to the slide selection signal. When the browser kernel receives the slide selection signal acting on the end point selection cursor, a text serving as an end point is selected according to the slide selection signal. The browser kernel determines the text between the starting point selection cursor and the end point selection cursor as the keyword selected by the slide selection signal.

Operation 703. The terminal determines the selected keyword as an interested character sequence.

The browser kernel determines the keyword selected by the slide selection signal as the interested character sequence.

Operation 704. The terminal transmits the interested character sequence to a server.

The browser kernel transmits the interested character sequence to the server.

Operation 705. The server receives the interested character sequence transmitted by the terminal.

The server receives the interested character sequence transmitted by the browser kernel, where the interested character sequence includes a keyword.

Operation 706. The server queries at least one group of recommended content corresponding to the keyword.

The server further stores a recommendation program and a recommended content database, where the recommendation program may be a program of an object-based collaborative filtering algorithm, or may be a neural network program.

After the server inputs the keyword into the recommendation program, the recommendation program may query the at least one group of recommended content associated with the keyword from the recommended content database.

Types of the recommended content include: at least one of a topic circle, a character introduction, an institution or an enterprise, a commodity, an application, a page, navigation, an audio, a video, a novel and encyclopedia related to the keyword.

Each group of recommended content is a combination of at least one element of a text, a picture, a website, an audio, and a video surrounding a recommended topic.

Operation 707. The server transmits the at least one group of recommended content to the terminal.

The server may transmit the at least one group of recommended content to the application in the terminal.

Operation 708. The terminal receives the at least one group of recommended content fed back by the server according to the interested character sequence.

The application receives the at least one group of recommended content fed back by the server according to the interested character sequence. The browser kernel receives the at least one group of recommended content fed back by the server according to the interested character sequence.

Operation 709. The terminal additionally displays at least one card view in a side area on a user interface of the application, each card view being used for displaying one group of recommended content.

Optionally, the application overlay-displays at least one group of card views in the side area on the user interface in a predetermined direction in a sequential arrangement mode, each card view being used for displaying the one group of recommended content.

The side area is a side area located on a top side, a bottom side, a left side or a right side of the user interface. Optionally, in a case that the terminal is vertically disposed, the side area is the top side area or the bottom side area. When the terminal is transversely disposed, the side area is the left side area or the right side area. A position of the side area is set on a principle that normal viewing of the page by the user is not affected as much as possible.

Optionally, the card view is displayed on the side area on the user interface in suspension form. When the terminal is vertically disposed, more than two card views are disposed in a suspension mode in a horizontal direction in a sequential arrangement mode. When the terminal is transversely disposed, more than two card views are disposed in a suspension mode in a vertical direction in a sequential arrangement mode. Adjacent card views are next to each other, or there is a spacing having a predetermined width between the adjacent card views.

Each card view is used for displaying one group of recommended content. Because the one group of recommended content may include at least one of a text, an image, a page, an audio, and a video, each card view may include one or more controls, and a type of each control is any one of a text control, an image control, a button control, an audio playback control, a video playback control and a document processing control. A plurality of different types of controls are integrated on the same card view, so that the card view can display different information in the one group of recommended content separately.

Optionally, each card view is rectangular or rounded rectangular. A width of each card view is less than a width of the side area, and a length of each card view is less than a length of the side area. Different card views may have the same length and width, or may have the same width and different lengths.

Because an area of the side area is limited, and all of the recommended content probably cannot be fully displayed, each card view located in the side area can be slidably displayed.

Operation 710. The terminal receives a slide signal in the side area.

When the more than two card views are disposed in a horizontal direction, the slide signal may be a leftward slide signal or a rightward slide signal. When the more than two card views are disposed in a vertical direction, the slide signal may be an upward slide signal or a downward slide signal.

Operation 711. The terminal moves a first card view located on a first side of the side area out of the side area along with the slide signal, and moves a second card view from a second side of the side area into the side area for display.

When the more than two card views are arranged in a horizontal direction, the slide display mode may be as follows:

The terminal receives the leftward slide signal in the side area, moves the first card view located on a left side of the side area out of the side area along with the leftward slide signal, and moves the second card view from a right side of the side area into the side area for display. Alternatively, the terminal receives the rightward slide signal in the side area, moves a third card view located on the right side of the side area out of the side area along with the rightward slide signal, and moves a fourth card view from the left side of the side area into the side area for display.

When the more than two card views are arranged in a vertical direction, the slide display mode may be as follows:

The terminal receives the upward slide signal in the side area, moves a fifth card view located on an upper side of the side area out of the side area along with the upward slide signal, and moves a sixth card view from a lower side of the side area into the side area for display. Alternatively, the terminal receives the downward slide signal in the side area, moves a seventh card view located on the lower side of the side area out of the side area along with the downward slide signal, and moves an eighth card view from the upper side of the side area into the side area for display.

Operation 712. The terminal receives a trigger signal on a target card view.

Because the area of each card view is limited, the recommended content that can be displayed is also limited. When intending to view more detailed content of the group of recommended content, a user may click the target card view corresponding to the group of recommended content.

The application receives the trigger signal on the target card view, where the trigger signal may be a trigger signal for clicking any position on the target card view, or may be a trigger signal for clicking a target control on the target card view. The target control may be at least one of a button control, an audio playback control, a video playback control, and a document processing control. Optionally, the application receives the trigger signal on the target card view through the browser kernel.

Operation 713. The terminal jumps to a user interface corresponding to the target card view according to the trigger signal.

The application jumps to the user interface corresponding to the target card view according to the trigger signal. The user interface may be a page, or may be a user interface of another application.

Based on the foregoing, according to the recommended content display method provided in some embodiments, the keyword manually selected by the user is further transmitted to the server, so that the server can determine more accurate recommended content with reference to the keyword manually selected by the user, thereby improving the effectiveness of the recommended content, and enabling the recommended content to better conform to an actual search intention of the user.

The embodiment of FIG. 13 and the embodiment of FIG. 4 may be implemented in combination. For example, in a case that a user presses an interface for a long time, the embodiment of FIG. 4 is used for displaying the recommended content and displaying the text selection control. Then, if the user uses the slide selection signal to select the keyword on the text selection control, the embodiment of FIG. 13 is used to display the recommended content.

The operations performed by the terminal in the foregoing method embodiments may be individually implemented to become the recommended content display method for the terminal side, and the operations performed by the server in the foregoing method embodiments may be individually implemented to become a recommended content transmission method for the server side.

The recommended content display method may be alternatively considered to be performed by the application in the terminal, or be performed by the browser kernel in the application.

The following is device embodiments of the present disclosure, where the device embodiments correspond to the foregoing method embodiments. For details not described in detail in the device embodiments, refer to the corresponding method embodiments.

Figure 14:
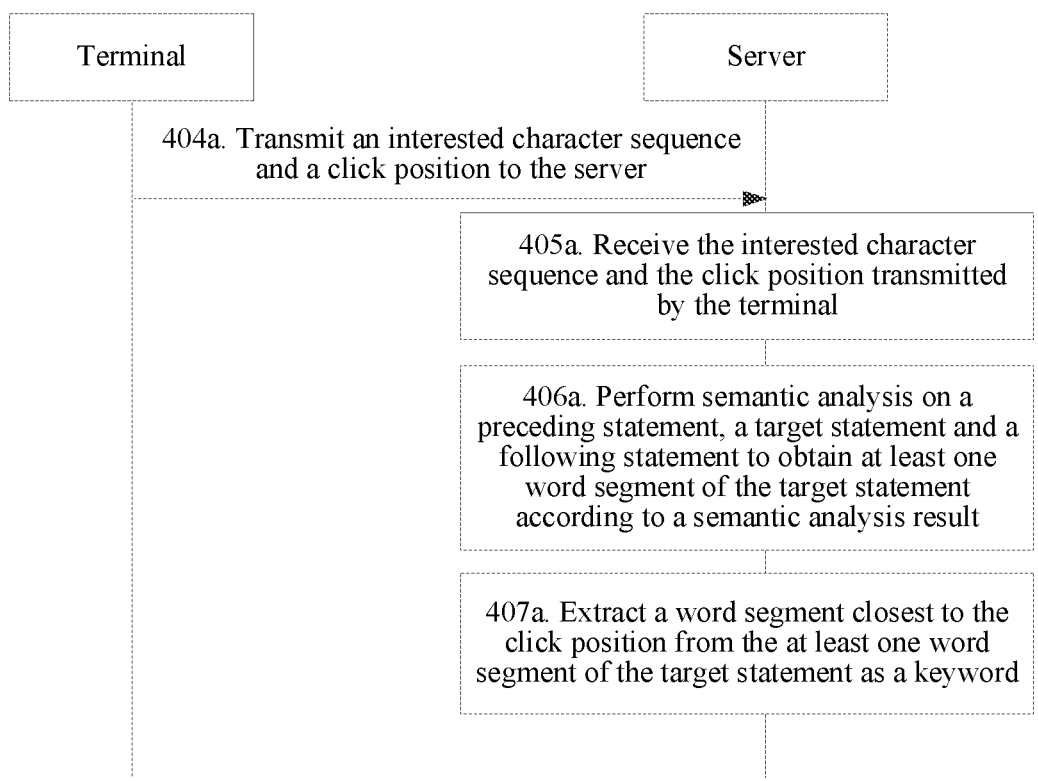
FIG. 14 is a flowchart of a recommended content display method according to another exemplary embodiment of the present disclosure.

FIG. 14 is a structural block diagram of a recommended content display device according to an exemplary embodiment of the present disclosure. The recommended content display device may be implemented as the entirety or a part of a terminal by means of software, hardware, or a combination thereof. An application is run in the terminal, where the application is a browser or a non-browser application, and the application includes a browser kernel. The device includes: a receiving module 820, a processing module 840, and a display module 860.

The receiving module 820 is configured to receive an operation signal directed to a page displayed on the application.

The processing module 840 is configured to determine an interested character sequence on the page according to the operation signal, where the interested character sequence is a character sequence displayed on the page.

The display module 860 is configured to additionally display at least one group of recommended content on a user interface of the application, where the at least one group of recommended content is information content associated with the interested character sequence.

In some embodiments, the processing module 840 is configured to determine, on the page, a target statement in which the operation signal is located; and determine the target statement, a preceding statement before the target statement and a following statement after the target statement as the interested character sequence.

In some embodiments, the device further includes a transmission module 880. The transmission module is configured to transmit the interested character sequence to a server, the interested character sequence being used for the server to perform semantic analysis to obtain a keyword in the target statement. The receiving module 820 is configured to receive the at least one group of recommended content fed back by the server according to the keyword.

In some embodiments, the processing module 840 is further configured to determine an operation position of the operation signal in the target statement. The transmission module 860 is further configured to transmit the operation position to the server, the operation position being used for the server to determine the keyword in the target statement based on the semantic analysis of the interested character sequence.

In some embodiments, the processing module 840 is further configured to, in a case that the operation signal is a slide selection signal, determine the keyword selected by the slide signal on the page; and determine the selected keyword as the interested character sequence.

In some embodiments, the display module 880 is configured to additionally display at least one card view in a side area on the user interface of the application, each card view being used for displaying one group of recommended content.

In some embodiments, the display module 880 is configured to overlay-display at least one group of card views in the side area on the user interface of the application in a predetermined direction in a sequential arrangement mode, each card view being used for displaying the one group of recommended content. A manner of "additionally displaying" includes, but is not limited to the following two cases.

1. A current level of the user interface of the application is kept unchanged, the at least one group of recommended content is overlay-displayed on an upper layer of a predetermined area of the user interface of the application, and a display level of the recommended content is higher than a display level of an original user interface.

2. The displayed content of the predetermined area of the user interface of the application is changed, and the changed displayed content is the at least one group of recommended content. The display level of the recommended content is the same as the display level of the original user interface.

In some embodiments, each card view includes one or more controls, and a type of each control is any one of a text control, an image control, a button control, an audio playback control, a video playback control and a document processing control.

In some embodiments, the receiving module 820 is configured to receive the slide signal in the side area. The display module 880 is configured to: move a first card view located on a first side of the side area out of the side area along with the slide signal, and move a second card view from a second side of the side area into the side area for display.

In some embodiments, the receiving module 820 is configured to receive a trigger signal on a target card view. The display module 880 is configured to jump to a user interface corresponding to the target card view according to the trigger signal.

Figure 15:
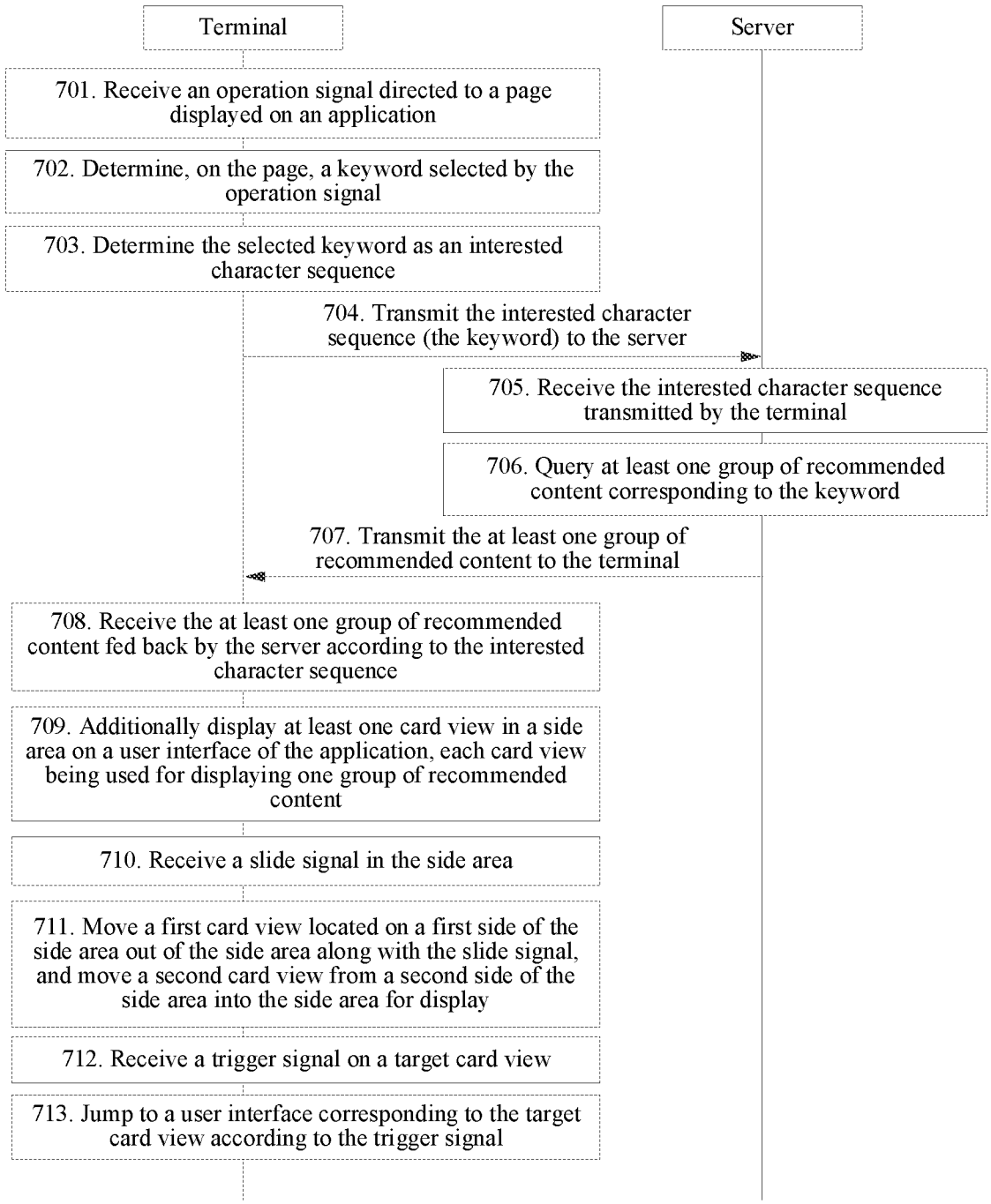
FIG. 15 is a flowchart of a recommended content display method according to another exemplary embodiment of the present disclosure.

FIG. 15 is a structural block diagram of a recommended content display device according to an exemplary embodiment of the present disclosure. The recommended content display device may be implemented as the entirety or a part of a server by means of software, hardware, or a combination thereof. The device includes: a receiving module 920, a processing module 940, and a transmission module 960.

The receiving module 920 is configured to receive an interested character sequence transmitted by a terminal, where the interested character sequence is a character sequence determined by the terminal on a page of an application according to a received operation signal.

The processing module 940 is configured to determine at least one group of recommended content according to the interested character sequence.

The transmission module 960 is configured to transmit the at least one group of recommended content to the terminal, the recommended content being used for the terminal to additionally display the recommended content on a user interface of the application.

In some embodiments, the interested character sequence includes a target statement, a preceding statement before the target statement and a following statement after the target statement. The processing module 940 is configured to: perform semantic analysis on the preceding statement, the target statement and the following statement to obtain at least one word segment of the target statement according to a semantic analysis result; extract a keyword from the at least one word segment of the target statement; and query the at least one group of recommended content corresponding to the keyword.

In some embodiments, the processing module 940 is configured to input the preceding statement, the target statement and the following statement into a preset neural network model to obtain the at least one word segment of the target statement.

In some embodiments, the receiving module 920 is further configured to receive an operation position transmitted by the terminal, where the operation position is an operation position, in the target statement, of a click signal received by the terminal.

The processing module 940 is configured to extract a word segment closest to the operation position from the at least one word segment of the target statement as the keyword.

In some embodiments, the interested character sequence includes a keyword. The processing module 940 is configured to query the at least one group of recommended content corresponding to the keyword.

Figure 16:
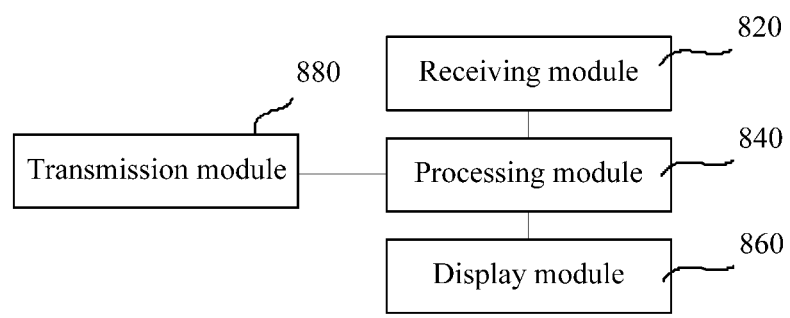
FIG. 16 is a block diagram of a recommended content display device according to another exemplary embodiment of the present disclosure.

FIG. 16 shows a structural block diagram of a terminal 1000 according to an exemplary embodiment of the present disclosure. The terminal 1000 may be a portable mobile terminal, for example, a smartphone, a tablet computer, a moving picture experts group audio layer III (MP3) player, or a moving picture experts group audio layer IV (MP4) player. The terminal 1000 may also be referred to as other names such as user equipment and a portable terminal.

Generally, the terminal 1000 includes a processor 1001 and a memory 1002.

The processor 1001 may include one or more processing cores, for example, a 4-core processor or an 8-core processor. The processor 1001 may be implemented in at least one hardware form of a digital signal processor (DSP), a field-programmable gate array (FPGA), and a programmable logic array (PLA). The processor 1001 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1001 may be integrated with a graphics processing unit (GPU). The GPU is configured to be responsible for rendering and drawing content that a display screen needs to display. In some embodiments, the processor 1001 may further include an artificial intelligence (AI) processor. The AI processor is configured to process a computing operation related to machine learning.

The memory 1002 may include one or more computer-readable storage media. The computer-readable storage medium may be tangible and non-transient. The memory 1002 may further include a high-speed random access memory and a non-volatile memory, for example, one or more disk storage devices, or flash memory devices. In some embodiments, the non-transient computer-readable storage medium in the memory 1002 is configured to store at least one instruction, and the at least one instruction is configured to be executed by the processor 1001 to implement the recommended content display method provided in the present disclosure.

In some embodiments, the terminal 1000 may optionally include: a peripheral device interface 1003 and at least one peripheral device. Specifically, the peripheral device includes: at least one of a radio frequency (RF) circuit 1004, a touch display screen 1005, a camera component 1006, an audio frequency circuit 1007, a positioning component 1008, and a power source 1009.

The peripheral device interface 1003 may be configured to connect the at least one peripheral device related to input/output (I/O) to the processor 1001 and the memory 1002. In some embodiments, the processor 1001, the memory 1002 and the peripheral device interface 1003 are integrated on the same chip or circuit board. In some other embodiments, any one or two of the processor 1001, the memory 1002, and the peripheral device interface 1003 may be implemented on a single chip or circuit board. This is not limited in some embodiments.

The RF circuit 1004 is configured to receive and transmit an RF signal, which is also referred as an electromagnetic signal. The RF circuit 1004 communicates with a communications network and other communications devices by using the electromagnetic signal. The RF circuit 1004 converts an electrical signal into an electromagnetic signal to be transmitted, or converts a received electromagnetic signal into an electrical signal. Optionally, the RF circuit 1004 includes: an antenna system, an RF transceiver, one or more amplifiers, a tuner, an oscillator, a digital signal processor, a codec chipset, a subscriber identity module card, and the like. The RF circuit 1004 may communicate with other terminals through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1004 may also include a circuit related to near field communication (NFC). This is not limited in the present disclosure.

The touch display screen 1005 is configured to display a user interface (UI). The UI may include a graphic, a text, an icon, a video, and any combination thereof. The touch display screen 1005 also has a capability of collecting a touch signal on or above a surface of the touch display screen 1005. The touch signal may be input to the processor 1001 for processing as a control signal. The touch display screen 1005 is configured to provide a virtual button and/or a virtual keyboard, which is also referred to as a soft button and/or a soft keyboard. In some embodiments, there may be one touch display screen 1005, disposed on a front panel of the terminal 1000. In some other embodiments, there may be at least two touch display screens 1005, disposed on different surfaces of the terminal 1000 respectively or in a folded design. In some more embodiments, the touch display screen 1005 may be a flexible display screen, disposed on a curved surface or a folded surface of the terminal 1000. Even, the touch display screen 1005 may be further set in a non-rectangular irregular pattern, namely, a special-shaped screen. The touch display screen 1005 may be made of a material such as a liquid crystal display (LCD) or an organic light-emitting diode (OLED).

The camera component 1006 is configured to collect an image or a video. Optionally, the camera component 1006 includes a front-facing camera and a rear-facing camera. Generally, the front-facing camera is configured to implement a video call or self-portrait. The rear-facing camera is configured to shooting a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera component 1006 may further include a flash. The flash may be a monochrome temperature flash, or may be a double color temperature flash. The double color temperature flash refers to a combination of a warm light flash and a cold light flash, and may be used for light compensation under different color temperatures.

The audio frequency circuit 1007 is configured to provide an audio interface between a user and the terminal 1000. The audio frequency circuit 1007 may include a microphone and a speaker. The microphone is configured to collect a sound wave of a user and an environment, and convert the sound wave into the electrical signal to be input to the processor 1001 for processing, or to be input to the RF circuit 1004 for implementing voice communication. For the purpose of stereo collection or noise reduction, there may be a plurality of microphones, disposed at different portions of the terminal 1000 respectively. The microphone may be further an array microphone or an omni-directional collection type microphone. The speaker is configured to convert the electrical signal from the processor 1001 or the RF circuit 1004 into the sound wave. The speaker may be a conventional film speaker, or may be a piezoelectric ceramic speaker. When the speaker is the piezoelectric ceramic speaker, not only can the electrical signal be converted into a sound wave audible to a human being, but also the electrical signal can be converted into a sound wave inaudible to the human being for ranging and the like. In some embodiments, the audio frequency circuit 1007 may alternatively include an earphone jack.

The positioning component 1008 is configured to position a current geographic location of the terminal 1000 for implementing navigation or a location based service (LBS). The positioning component 1008 may be a positioning component based on a global positioning system (GPS) of the United States, a Beidou system of China, or a Galileo system of Russia.

The power source 1009 is configured to supply power for various components in the terminal 1000. The power source 1009 may be an alternating current, a direct current, a disposable battery, or a rechargeable battery. When the power source 1009 includes the rechargeable battery, the rechargeable battery may be a wired rechargeable battery or a wireless rechargeable battery. The wired rechargeable battery is a battery charged through a wired line. The wireless rechargeable battery is a battery charged through a wireless coil. The rechargeable battery may be further configured to support a fast charge technology.

In some embodiments, the terminal 1000 further includes one or more sensors 1010. The one or more sensors 1010 include but are not limited to: an acceleration sensor 1011, a gyroscope sensor 1012, a pressure sensor 1013, a fingerprint sensor 1014, an optical sensor 1015, and a proximity sensor 1016.

The acceleration sensor 1011 may detect the magnitude of acceleration on three coordinate axes of a coordinate system established with the terminal 1000. For example, the acceleration sensor 1011 may be configured to detect components of gravity acceleration on the three coordinate axes. The processor 1001 may control, according to a gravity acceleration signal collected by the acceleration sensor 1011, the touch display screen 1005 to display the user interface in a transverse view or a longitudinal view. The acceleration sensor 1011 may be further configured to collect motion data of a game or a user.

The gyroscope sensor 1012 may detect a body direction and a rotation angle of the terminal 1000. The gyroscope sensor 1012 may cooperate with the acceleration sensor 1011 to collect a 3D action by the user on the terminal 1000. The processor 1001 may implement the following functions according to the data collected by the gyroscope sensor 1012: motion sensing (such as changing the UI according to a tilt operation of the user), image stabilization at shooting, game control, and inertial navigation.

The pressure sensor 1013 may be disposed at a side frame of the terminal 1000 and/or a lower layer of the touch display screen 1005. When the pressure sensor 1013 is disposed at the side frame of the terminal 1000, a holding signal of the user on the terminal 1000 may be detected, and left/right hand identification and a quick action may be performed according to the holding signal. When the pressure sensor 1013 is disposed at the lower layer of the touch display screen 1005, an operable control on the UI interface can be controlled according to a pressure operation of the user on the touch display screen 1005. The operable control includes at least one of a button control, a scroll-bar control, an icon control and a menu control.

The fingerprint sensor 1014 is configured to collect a user's fingerprint to identify a user's identity according to the collected fingerprint. When identifying that the user's identity is a trusted identity, the processor 1001 authorizes the user to perform related sensitive operations. The sensitive operations include: unlocking a screen, viewing encryption information, downloading software, paying, changing a setting, and the like. The fingerprint sensor 1014 may be disposed on a front surface, a back surface, or a side surface of the terminal 1000. When a physical button or a vendor logo is disposed on the terminal 1000, the fingerprint sensor 1014 may be integrated with the physical button or the vendor logo.

The optical sensor 1015 is configured to collect ambient light intensity. In an embodiment, the processor 1001 may control display brightness of the touch display screen 1005 according to the ambient light intensity collected by the optical sensor 1015. Specifically, in a case that the ambient light intensity is relatively high, the display brightness of the touch display screen 1005 is turned up. When the ambient light intensity is relatively low, the display brightness of the touch display screen 1005 is turned down. In another embodiment, the processor 1001 may further dynamically adjust a shooting parameter of the camera component 1006 according to the ambient light intensity collected by the optical sensor 1015.

The proximity sensor 1016, also referred to as a distance sensor, is generally disposed on the front surface of the terminal 1000. The proximity sensor 1016 is configured to collect a distance between the user and the front surface of the terminal 1000. In an embodiment, in a case that the proximity sensor 1016 detects that the distance between the user and the front surface of the terminal 1000 gradually becomes smaller, the touch display screen 1005 is controlled by the processor 1001 to switch from a screen-on state to a screen-off state. When the proximity sensor 1016 detects that the distance between the user and the front surface of the terminal 1000 gradually becomes larger, the touch display screen 1005 is controlled by the processor 1001 to switch from the screen-off state to the screen-on state.

A person skilled in the art may understand that a structure shown in FIG. 16 constitutes no limitation on the terminal 1000, and the terminal may include more or fewer components than those shown in the figure, or some components may be combined, or a different component deployment may be used.

Figure 17:
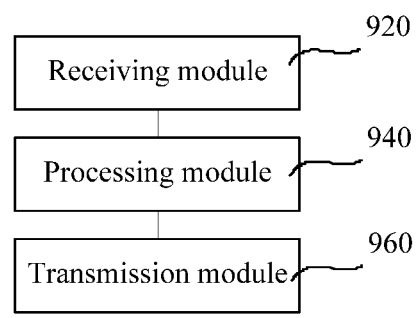
FIG. 17 is a block diagram of a recommended content transmission device according to another exemplary embodiment of the present disclosure.
Figure 18:
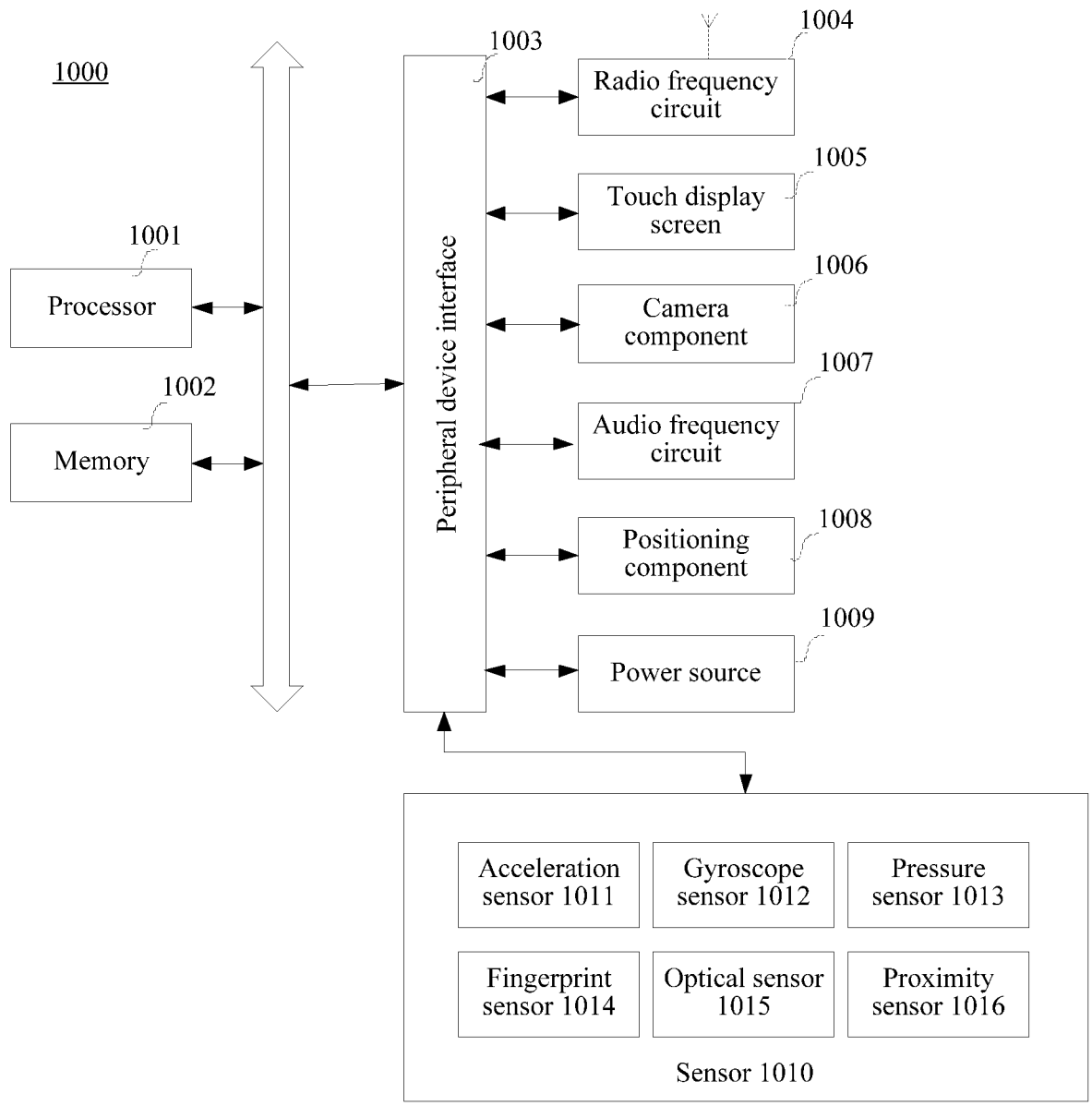
FIG. 18 is a block diagram of a terminal according to another exemplary embodiment of the present disclosure.
Figure 19:
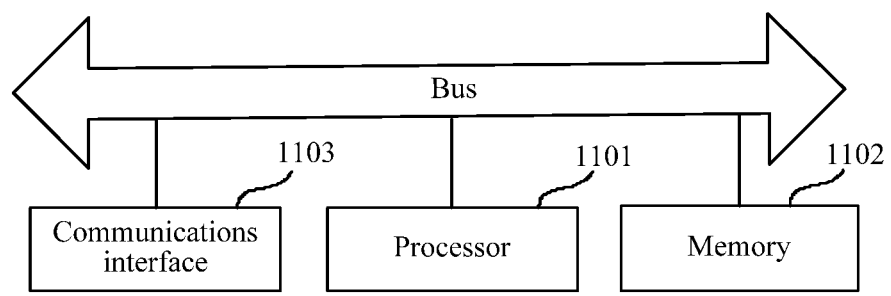
FIG. 19 is a block diagram of a server according to another exemplary embodiment of the present disclosure.

FIG. 17 is a structural block diagram of a server according to an embodiment of the present disclosure. The server includes: a processor 1101, a memory 1102, and a communications interface 1103.

The communications interface 1103 is connected to the processor 1101 by using a bus or in other manners, and is configured to receive at least one document transmitted by at least one data source.

The processor 1101 may be a central processing unit (CPU), a network processor (NP), or a combination of the CPU and the NP. The processor 1101 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1102 is connected to the processor 1101 by using a bus or in other manners. The memory 1102 stores at least one instruction, at least one program, and a code set or an instruction set. The at least one instruction, the at least one program, and the code set or the instruction set is loaded and executed by the processor 1101 to implement the recommended content transmission method for the server side shown in the foregoing method embodiments. The memory 1102 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be an optical disc.

An embodiment of the present disclosure further provides a computer-readable storage medium, the storage medium storing at least one instruction, at least one program, a code set or an instruction set. The at least one instruction, the at least one program, the code set or the instruction set is loaded and executed by a processor to implement the recommended content display method performed by the terminal or the recommended content transmission method performed by the server shown in the method embodiments. Optionally, the computer-readable storage medium includes a high-speed access memory and a non-volatile memory.

An embodiment of the present disclosure further provides a computer program product, the program product storing at least one instruction, at least one program, a code set or an instruction set. The at least one instruction, the at least one program, the code set or the instruction set is loaded and executed by a processor to implement the recommended content display method performed by the terminal or the recommended content transmission method performed by the server shown in the method embodiments.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A recommended content display method, applied to a terminal and comprising:
   receiving an operation signal directed to a target statement in a page displayed on a user interface of an application;
   determining an interested character sequence on the page according to the operation signal, the interested character sequence including the target statement and at least one of a first statement immediately preceding the target statement or a second statement immediately following the target statement, wherein the target statement, the first statement, and the second statement are sentences;
   transmitting the interested character sequence to a server to obtain a keyword, wherein the server performs, according to context semantics of at least one of the first statement or the second statement, semantic analysis on the target statement to obtain a segmentation result of the target statement, the segmentation result including at least one word segment of the target statement and a corresponding weight assigned to each of the at least one segment of the target statement and determined based on the context semantics of at least one of the first statement or the second statement, and the keyword being extracted from the at least one word segment of the target statement and including a word segment having a maximum weight among the at least one segment of the target statement;
   receiving at least one group of recommended content fed back by the server according to the keyword; and
   additionally displaying the at least one group of recommended content on the user interface of the application, the at least one group of recommended content being information content associated with the interested character sequence.

2. The method according to claim 1, further comprising:
   determining an operation position of the operation signal in the target statement; and
   transmitting the operation position to the server, the operation position being used by the server to determine the keyword in the target statement based on the semantic analysis of the interested character sequence.

3. The method according to claim 1, wherein the additionally displaying at least one group of recommended content on a user interface of the application comprises:
   displaying at least one card view in an assigned area on the user interface of the application, each card view displaying one group of recommended content.

4. The method according to claim 2, wherein:
   the keyword includes a word segment closest to the operation position among the at least one segment of the target statement.

5. The method according to claim 3, wherein the additionally displaying at least one group of card views in an assigned area on the page comprises:
   overlaying the at least one card view in the assigned area on the user interface of the application in a predetermined direction in a sequential arrangement mode.

6. The method according to claim 5, wherein each card view comprises one or more controls, and a type of each control is any one of a text control, an image control, a button control, an audio playback control, a video playback control and a document processing control.

7. The method according to claim 5, wherein after overlaying the at least one card view in the assigned area on the page, the method further comprises:
   receiving a slide signal in the assigned area; and
   moving a first card view located on a first side of the assigned area out of the assigned area in response to the slide signal, and moving a second card view from a second side of the assigned area into the assigned area for display.

8. The method according to claim 5, wherein after displaying the at least one card view, the method comprises:
   receiving a trigger signal on a target card view; and
   jumping to a user interface corresponding to the target card view according to the trigger signal.

9. The method according to claim 1, wherein the keyword includes at least one of:
   a word belonging to noun part-of-speech from the at least one segment of the target statement; or
   a semantic subject or a semantic object of the target statement.

10. The method according to claim 1, wherein the semantic analysis on the target statement comprises:
    inputting the first statement, the second statement, and the target statement into a preset neural network model;
    obtaining the at least one word segment of the target statement and a corresponding weight for each word segment of the target statement outputted by the preset neural network model.

11. A terminal, comprising a processor and a memory, the processor being configured to:
    receive an operation signal directed to a target statement in a page displayed on a user interface of an application;
    determine an interested character sequence on the page according to the operation signal, the interested character sequence including the target statement and at least one of a first statement immediately preceding the target statement or a second statement immediately following the target statement, wherein the target statement, the first statement, and the second statement are sentences;
    transmit the interested character sequence to a server to obtain a keyword, wherein the server performs, according to context semantics of at least one of the first statement or the second statement, semantic analysis on the target statement to obtain a segmentation result of the target statement, the segmentation result including at least one word segment of the target statement and a corresponding weight assigned to each of the at least one segment of the target statement and determined based on the context semantics of at least one of the first statement or the second statement, and the keyword being extracted from the at least one word segment of the target statement and including a word segment having a maximum weight among the at least one segment of the target statement;

receive at least one group of recommended content fed back by the server according to the keyword; and additionally display at least one group of recommended content on the user interface of the application, the at least one group of recommended content being information content associated with the interested character sequence.

12. The terminal according to claim 11, wherein the processor is further configured to:

determine an operation position of the operation signal in the target statement; and transmit the operation position to the server, the operation position being used by the server to determine the keyword in the target statement based on the semantic analysis of the interested character sequence.

13. The terminal according to claim 11, wherein the additionally displaying at least one group of recommended content on a user interface of the application comprises:

displaying at least one card view in an assigned area on the user interface of the application, each card view displaying one group of recommended content.

14. The terminal according to claim 13, wherein the additionally displaying at least one group of card views in an assigned area on the page comprises:

overlaying the at least one card view in the assigned area on the user interface of the application in a predetermined direction in a sequential arrangement mode.

15. The terminal according to claim 14, wherein each card view comprises one or more controls, and a type of each control is any one of a text control, an image control, a button control, an audio playback control, a video playback control and a document processing control.

16. The terminal according to claim 14, wherein after overlaying the at least one card view in the assigned area on the page, the processor is further configured to:

receive a slide signal in the assigned area; and move a first card view located on a first side of the assigned area out of the assigned area in response to the slide signal, and moving a second card view from a second side of the assigned area into the assigned area for display.

17. The terminal according to claim 14, wherein after displaying the at least one card view, the processor is further configured to:

receive a trigger signal on a target card view; and jump to a user interface corresponding to the target card view according to the trigger signal.

18. A non-transitory computer-readable storage medium, storing at least one instruction, the at least one instruction being loaded and executed by a processor to perform:

receiving an operation signal directed to a target statement in a page displayed on a user interface of an application;

determining an interested character sequence on the page according to the operation signal, the interested character sequence including the target statement and at least one of a first statement immediately preceding the target statement or a second statement immediately following the target statement, wherein the target statement, the first statement, and the second statement are sentences;

transmitting the interested character sequence to a server to obtain a keyword, wherein the server performs, according to context semantics of at least one of at least one of the first statement or the second statement, semantic analysis on the target statement to obtain a segmentation result of the target statement, the segmentation result including at least one word segment of the target statement and a corresponding weight assigned to each of the at least one segment of the target statement and determined based on the context semantics of at least one of the first statement or the second statement, and the keyword being extracted from the at least one word segment of the target statement and including a word segment having a maximum weight among the at least one segment of the target statement;

receiving at least one group of recommended content fed back by the server according to the keyword; and additionally displaying at least one group of recommended content on the user interface of the application, the at least one group of recommended content being information content associated with the interested character sequence.

19. The storage medium according to claim 18, wherein the at least one instruction further cause the processor to perform:

determining an operation position of the operation signal in the target statement; and transmitting the operation position to the server, the operation position being used by the server to determine the keyword in the target statement based on the semantic analysis of the interested character sequence.

20. The storage medium according to claim 18, wherein the additionally displaying at least one group of recommended content on a user interface of the application comprises:

displaying at least one card view in an assigned area on the user interface of the application, each card view displaying one group of recommended content.

* * * * *